US010598063B2

(12) United States Patent
Yoda et al.

(10) Patent No.: US 10,598,063 B2
(45) Date of Patent: Mar. 24, 2020

(54) EXHAUST PURIFICATION SYSTEM OF INTERNAL COMBUSTION ENGINE

(71) Applicant: TOYOTA JIDOSHA KABUSHIKI KAISHA, Toyota-shi, Aichi-ken (JP)

(72) Inventors: Kimikazu Yoda, Susono (JP); Keiichiro Aoki, Sunto-gun (JP); Go Hayashita, Chigasaki (JP)

(73) Assignee: Toyota Jidosha Kabushiki Kaisha, Toyota-shi, Aich-ken (JP)

( * ) Notice: Subject to any disclaimer, the term of this patent is extended or adjusted under 35 U.S.C. 154(b) by 60 days.

(21) Appl. No.: 15/937,623

(22) Filed: Mar. 27, 2018

(65) Prior Publication Data
US 2019/0101033 A1    Apr. 4, 2019

(30) Foreign Application Priority Data

Mar. 31, 2017  (JP) ................................. 2017-072305
Oct. 6, 2017   (JP) ................................. 2017-196290

(51) Int. Cl.
*F01N 3/08*   (2006.01)
*B01D 53/94*  (2006.01)
(Continued)

(52) U.S. Cl.
CPC ......... *F01N 3/0842* (2013.01); *B01D 53/945* (2013.01); *B01D 53/9418* (2013.01);
(Continued)

(58) Field of Classification Search
CPC combination set(s) only.
See application file for complete search history.

(56) References Cited

U.S. PATENT DOCUMENTS 6,145,305 A * 11/2000 Itou .................... B01D 53/9495
                                                      60/274
6,694,724 B2 * 2/2004 Tanaka ............... B01D 53/9431
                                                      60/274
(Continued)

FOREIGN PATENT DOCUMENTS

JP        8-158857    6/1996
JP        H9-125937 A 5/1997
JP        2002-138821 5/2002

*Primary Examiner* — Binh Q Tran
(74) *Attorney, Agent, or Firm* — Finnegan, Henderson, Farabow, Garrett & Dunner, LLP

(57) ABSTRACT

An exhaust purification system comprises an exhaust purification catalyst 20, an $NO_X$ sensor 46, air-fuel ratio sensor 41 downstream of the catalyst 20, and a control and diagnosis device. The device alternately sets a target air-fuel ratio to a rich air-fuel ratio and a lean air-fuel ratio and switches the target air-fuel ratio from the rich air-fuel ratio to the lean air-fuel ratio when the output air-fuel ratio of the air-fuel ratio sensor becomes a rich judged air-fuel ratio or less. The device diagnoses abnormality of the catalyst based on the output of the $NO_X$ sensor. It diagnoses abnormality of the catalyst when the air-fuel ratio of the exhaust gas flowing into the catalyst is a rich air-fuel ratio, but does not diagnose abnormality of the catalyst when the air-fuel ratio of the exhaust gas flowing into the catalyst is a lean air-fuel ratio.

9 Claims, 22 Drawing Sheets

(51) Int. Cl.
　　*F01N 3/10*　　　　(2006.01)
　　*F01N 13/00*　　　(2010.01)
(52) U.S. Cl.
　　CPC ..... *B01D 53/9422* (2013.01); *B01D 53/9495* (2013.01); *F01N 3/0814* (2013.01); *F01N 3/0885* (2013.01); *F01N 3/101* (2013.01); *F01N 13/009* (2014.06); *B01D 53/9431* (2013.01); *B01D 2255/1021* (2013.01); *F01N 2430/06* (2013.01); *F01N 2550/00* (2013.01); *F01N 2560/025* (2013.01); *F01N 2560/026* (2013.01); *F01N 2560/14* (2013.01)

(56)　　　　　　References Cited

U.S. PATENT DOCUMENTS

| | | | |
|---|---|---|---|
| 10,107,163 B2 * | 10/2018 | Shinoda | F01N 3/2073 |
| 10,288,000 B2 * | 5/2019 | Masubuchi | F01N 3/2066 |
| 2004/0123585 A1 * | 7/2004 | Yamaguchi | B01D 53/90 |
| | | | 60/274 |
| 2016/0025026 A1 * | 1/2016 | Kitaura | F02D 41/1439 |
| | | | 60/276 |

* cited by examiner

FIG. 1
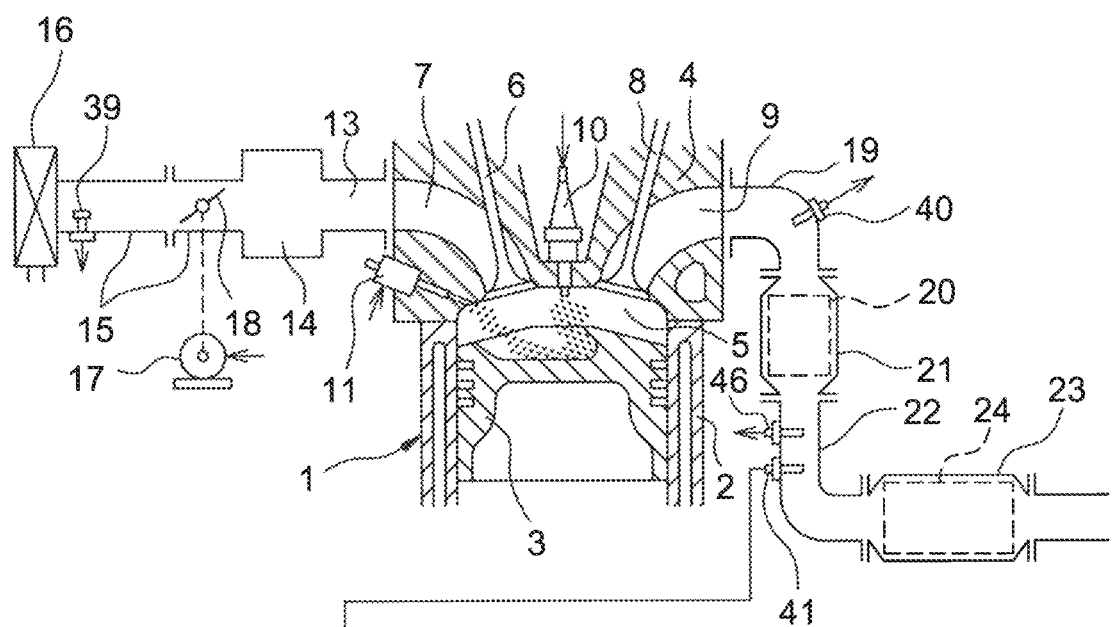
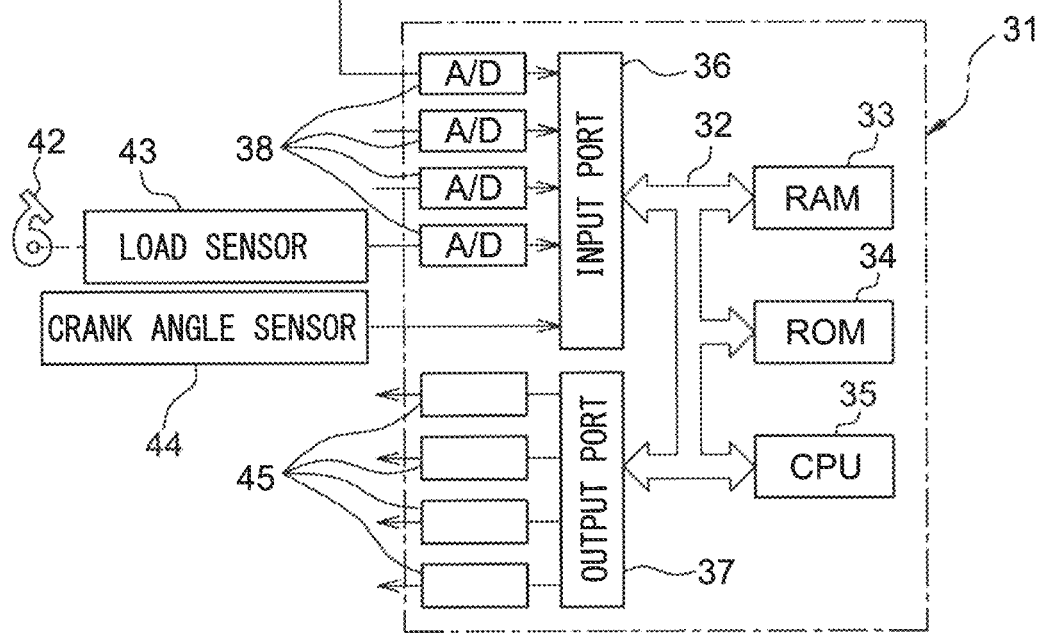

EXHAUST PURIFICATION SYSTEM OF INTERNAL COMBUSTION ENGINE

TECHNICAL FIELD

The present invention relates to an exhaust purification system of an internal combustion engine.

BACKGROUND ART

Known in the past has been an exhaust purification system of an internal combustion engine, which diagnoses an exhaust purification catalyst for an abnormality (degree of deterioration), based on an output of an $NO_X$ sensor arranged at a downstream side of the exhaust purification catalyst in the direction of flow of exhaust. As such an exhaust purification system, for example, there is known one which judges that the exhaust purification catalyst is abnormal when the output of the $NO_X$ sensor when the air-fuel ratio of the exhaust gas flowing out from the exhaust purification catalyst is near the stoichiometric air-fuel ratio is a reference value or more (for example, PLT 1).

CITATION LIST

Patent Literature

PLT 1: Japanese Patent Publication No. 2002-138821A

SUMMARY OF INVENTION

Technical Problem

In this regard, in the exhaust purification system described in the above-mentioned PLT 1, the target air-fuel ratio of the exhaust gas flowing into the exhaust purification catalyst is alternately set to an air-fuel ratio richer than the stoichiometric air-fuel ratio (below, referred to as a "rich air-fuel ratio") and an air-fuel ratio leaner than the stoichiometric air-fuel ratio (below, referred to as a "lean air-fuel ratio"). In this exhaust purification system, even if setting the target air-fuel ratio to a rich air-fuel ratio, the oxygen stored in the exhaust purification catalyst is released and the unburned gas is removed by the exhaust purification catalyst whereby the air-fuel ratio of the exhaust gas flowing out from the exhaust purification catalyst is substantially the stoichiometric air-fuel ratio. Similarly, even if setting the target air-fuel ratio to a lean air-fuel ratio, since oxygen is stored in the exhaust purification catalyst, the air-fuel ratio of the exhaust gas flowing out from the exhaust purification catalyst is substantially the stoichiometric air-fuel ratio.

On the other hand, as explained above, in the exhaust purification system described in PLT 1, abnormality in the exhaust purification catalyst is diagnosed when the air-fuel ratio of the exhaust gas flowing out from the exhaust purification catalyst is near the stoichiometric air-fuel ratio. Therefore, in the exhaust purification system described in PLT 1, abnormality in the exhaust purification catalyst is diagnosed both when the air-fuel ratio of the exhaust gas flowing into the exhaust purification catalyst is a rich air-fuel ratio and is a lean air-fuel ratio.

However, if maintaining the target air-fuel ratio at a rich air-fuel ratio in a state where the oxygen storage amount of the exhaust purification catalyst is low and oxygen cannot be released, hydrocarbons (HC), etc., sometimes deposit around the catalyst precious metal carried on the exhaust purification catalyst. If HC, etc., deposits around the catalyst precious metal in this way, the oxidizing action of the catalyst precious metal falls (HC poisoning). If setting the target air-fuel ratio of the exhaust gas flowing into the exhaust purification catalyst at a lean air-fuel ratio in such a state, since the exhaust purification catalyst is poisoned by HC, despite the exhaust purification catalyst itself not greatly deteriorating, there is a possibility that the exhaust purification catalyst will be misjudged as being abnormal in the abnormality diagnosis of the exhaust purification catalyst.

The present invention was made in consideration of the above problem and has as its object to keep misjudgment from occurring when diagnosing abnormality in an exhaust purification catalyst based on the output of an $NO_X$ sensor.

Solution to Problem

The present invention was made so as to solve the above problem and has as its gist the following.

(1) An exhaust purification system of an internal combustion engine, comprising: an exhaust purification catalyst provided in an exhaust passage of the internal combustion engine and carrying a catalyst precious metal; an $NO_X$ sensor provided in the exhaust purification catalyst or in the exhaust passage at a downstream side of the exhaust purification catalyst in the direction of flow of exhaust; an air-fuel ratio sensor provided in the exhaust passage at the downstream side of the exhaust purification catalyst in the direction of flow of exhaust; and a control device for controlling the target air-fuel ratio of exhaust gas flowing into the exhaust purification catalyst and estimating a state of the exhaust purification catalyst based on an output of the $NO_X$ sensor, wherein the control device is configured to alternately set the target air-fuel ratio to a rich air-fuel ratio richer than a stoichiometric air-fuel ratio and a lean air-fuel ratio leaner than the stoichiometric air-fuel ratio, and switch the target air-fuel ratio from a rich air-fuel ratio to a lean air-fuel ratio when the air-fuel ratio of exhaust gas detected by the air-fuel ratio sensor becomes equal to or less than a rich judged air-fuel ratio richer than the stoichiometric air-fuel ratio, and wherein the control device is configured to estimate a degree of irreversible deterioration of the exhaust purification catalyst accompanying sintering of the catalyst precious metal, not based on the output of the $NO_X$ sensor when the air-fuel ratio of exhaust gas flowing into the exhaust purification catalyst is a lean air-fuel ratio, but based on the output of the $NO_X$ sensor when the air-fuel ratio of exhaust gas flowing into the exhaust purification catalyst is a rich air-fuel ratio, in first deterioration degree estimation control.

(2) The exhaust purification system of an internal combustion engine according to (1), wherein the control device is configured to diagnose abnormality in the exhaust purification catalyst based on a degree of irreversible deterioration, and diagnose abnormality in the exhaust purification catalyst when the air-fuel ratio of exhaust gas flowing into the exhaust purification catalyst is a rich air-fuel ratio, but not diagnose abnormality in the exhaust purification catalyst when the air-fuel ratio of exhaust gas flowing into the exhaust purification catalyst is a lean air-fuel ratio.

(3) The exhaust purification system of an internal combustion engine according to (1) or (2), wherein the control device is configured to, in the first deterioration degree estimation control, estimate a degree of irreversible deterioration of the exhaust purification catalyst, based on the output of the $NO_X$ sensor in a center time period away from the switching timing of the target air-fuel ratio in the time period where the air-fuel ratio of the exhaust gas flowing into the exhaust purification catalyst is a rich air-fuel ratio from when switching the target air-fuel ratio to a rich air-fuel ratio to when switching it to a lean air-fuel ratio.

(4) The exhaust purification system of an internal combustion engine according to any one of (1) to (3), wherein the control device is configured to estimate a degree of total deterioration of the exhaust purification catalyst including the irreversible deterioration and reversible deterioration due to sulfur poisoning of the exhaust purification catalyst without using output of the $NO_X$ sensor, in second deterioration degree estimation control, and the control device is configured to estimate a degree of reversible deterioration of the exhaust purification catalyst, based on a degree of total deterioration estimated by the second deterioration degree estimation control and a degree of irreversible deterioration estimated by the first deterioration degree estimation control.

(5) The exhaust purification system of an internal combustion engine according to (3), wherein the control device is configured to estimate a degree of total deterioration of the exhaust purification catalyst including the irreversible deterioration and reversible deterioration due to sulfur poisoning of the exhaust purification catalyst without using output of the $NO_X$ sensor, in second deterioration degree estimation control, and the control device is configured to set a poisoning reference value based on the degree of irreversible deterioration estimated by the first deterioration degree estimation control so as to be larger as the degree of irreversible deterioration is larger, and judge that the exhaust purification catalyst is poisoned by sulfur if the degree of total deterioration estimated by the second deterioration degree estimation control has become the poisoning reference value or more.

(6) The exhaust purification system of an internal combustion engine according to (4) or (5), further comprising an air-fuel ratio sensor provided in the exhaust passage at a downstream side of the exhaust purification catalyst in the direction of flow of exhaust, wherein the control device is configured to, in the second deterioration degree estimation control, estimate a degree of total deterioration of the exhaust purification catalyst, based on an amount of oxygen stored in the exhaust purification catalyst from when an output air-fuel ratio of the air-fuel ratio sensor is a rich judged air-fuel ratio richer than the stoichiometric air-fuel ratio or less to when the output air-fuel ratio becomes a lean judged air-fuel ratio leaner than the stoichiometric air-fuel ratio or a value of a parameter changing in accordance with that amount of oxygen, or based on an amount of oxygen released from the exhaust purification catalyst from when an output air-fuel ratio of the air-fuel ratio sensor is a lean judged air-fuel ratio or more to when the output air-fuel ratio becomes a rich judged air-fuel ratio or less or a value of a parameter changing in accordance with that amount of oxygen.

(7) The exhaust purification system of an internal combustion engine according to (4) or (5), further comprising an air-fuel ratio sensor provided in the exhaust passage at a downstream side of the exhaust purification catalyst in the direction of flow of exhaust, wherein the control device is configured to switch the target air-fuel ratio from a rich air-fuel ratio to a lean air-fuel ratio when the air-fuel ratio of exhaust gas detected by the air-fuel ratio sensor becomes equal to or less than a rich judged air-fuel ratio richer than the stoichiometric air-fuel ratio, and wherein the control device is configured to, in the second deterioration degree estimation control, to estimate a degree of total deterioration of the exhaust purification catalyst based on at least part of the behavior of the output air-fuel ratio of the air-fuel ratio sensor after the target air-fuel ratio is switched from the rich air-fuel ratio to the lean air-fuel ratio and before the output air-fuel ratio of the air-fuel ratio sensor reaches the stoichiometric air-fuel ratio.

(8) The exhaust purification system of the internal combustion engine according to (4), wherein the control device is configured to estimate a sulfur content of fuel supplied to the internal combustion engine based on a trend in the degree of reversible deterioration of the exhaust purification catalyst with respect to a time or a change of a cumulative value of an intake air amount in content estimation control.

(9) The exhaust purification system of the internal combustion engine according to (8) wherein the control device is configured to sulfur desorption processing for desorbing the sulfur component stored at the exhaust purification catalyst, and the content estimation control is started after completion of the sulfur desorption processing.

Advantageous Effect of Invention

According to the present invention, there is provided an exhaust purification system of an internal combustion engine, which can keep misjudgment from occurring when diagnosing abnormality in an exhaust purification catalyst based on an output of an $NO_X$ sensor.

BRIEF DESCRIPTION OF DRAWINGS

FIG. 1 is a view schematically showing an internal combustion engine in which an exhaust purification system according to one embodiment is used.

DESCRIPTION OF EMBODIMENTS

Figure 2:
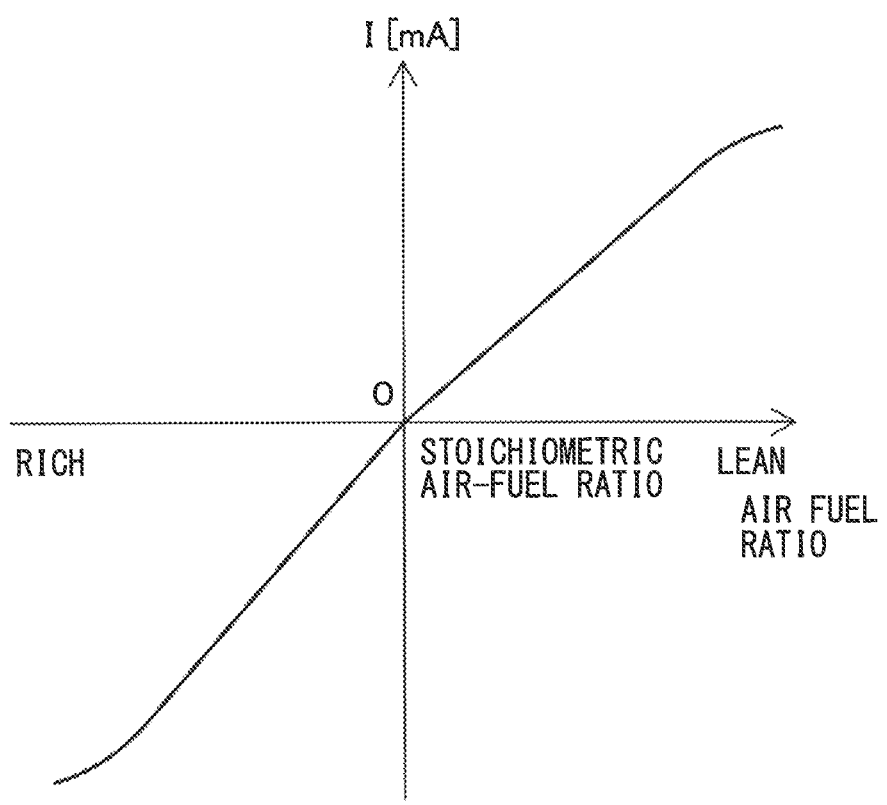
FIG. 2 is a view showing a relationship between an air-fuel ratio of exhaust gas around an air-fuel ratio sensor and an output current of the air-fuel ratio sensor.

Below, referring to the drawings, embodiments of the present invention will be explained in detail. Note that, in the following explanation, similar component elements are assigned the same reference numerals.

First Embodiment

<<Explanation of Internal Combustion Engine as a Whole>>

FIG. 1 is a view which schematically shows an internal combustion engine in which an exhaust purification system according to a first embodiment of the present invention is used. Referring to FIG. 1, 1 indicates an engine body, 2 a cylinder block, 3 a piston which reciprocates inside the cylinder block 2, 4 a cylinder head which is fastened to the cylinder block 2, 5 a combustion chamber which is formed between the piston 3 and the cylinder head 4, 6 an intake valve, 7 an intake port, 8 an exhaust valve, and 9 an exhaust port. The intake valve 6 opens and closes the intake port 7, while the exhaust valve 8 opens and closes the exhaust port 9.

As shown in FIG. 1, a spark plug 10 is arranged at a center part of an inside wall surface of the cylinder head 4, while a fuel injector 11 is arranged at a side part of the inner wall surface of the cylinder head 4. The spark plug 10 is configured to generate a spark in accordance with an ignition signal. Further, the fuel injector 11 injects a predetermined amount of fuel into the combustion chamber 5 in accordance with an injection signal. Note that, the fuel injector 11 may also be arranged so as to inject fuel into the intake port 7. Further, in the present embodiment, gasoline with a stoichiometric air-fuel ratio of 14.6, is used as the fuel. However, the internal combustion engine using the exhaust purification system of the present invention may also use fuel other than gasoline, or mixed fuel with gasoline.

The intake port 7 of each cylinder is connected to a surge tank 14 through a corresponding intake runner 13, while the surge tank 14 is connected to an air cleaner 16 through an intake pipe 15. The intake port 7, intake runner 13, surge tank 14, and intake pipe 15 form an intake passage. Further, inside the intake pipe 15, a throttle valve 18 which is driven by a throttle valve drive actuator 17 is arranged. The throttle valve 18 can be operated by the throttle valve drive actuator 17 to thereby change the aperture area of the intake passage.

On the other hand, the exhaust port 9 of each cylinder is connected to an exhaust manifold 19. The exhaust manifold 19 has a plurality of runners which are connected to the exhaust ports 9 and a header at which these runners are collected. The header of the exhaust manifold 19 is connected to an upstream side casing 21 which houses an upstream side exhaust purification catalyst 20. The upstream side casing 21 is connected through an exhaust pipe 22 to a downstream side casing 23 which houses a downstream side exhaust purification catalyst 24. The exhaust port 9, exhaust manifold 19, upstream side casing 21, exhaust pipe 22, and downstream side casing 23 form an exhaust passage.

The electronic control unit (ECU) 31 is comprised of a digital computer which is provided with components which are connected together through a bidirectional bus 32 such as a RAM (random access memory) 33, ROM (read only memory) 34, CPU (microprocessor) 35, input port 36, and output port 37. In the intake pipe 15, an air flow meter 39 is arranged for detecting the flow rate of air which flows through the intake pipe 15. The output of this air flow meter 39 is input through a corresponding AD converter 38 to the input port 36. Further, at the header of the exhaust manifold 19, an upstream side air-fuel ratio sensor 40 is arranged which detects the air-fuel ratio of the exhaust gas which flows through the inside of the exhaust manifold 19 (that is, the exhaust gas which flows into the upstream side exhaust purification catalyst 20). In addition, in the exhaust pipe 22, a downstream side air-fuel ratio sensor 41 is arranged which detects the air-fuel ratio of the exhaust gas which flows through the inside of the exhaust pipe 22 (that is, the exhaust gas which flows out from the upstream side exhaust purification catalyst 20 and flows into the downstream side exhaust purification catalyst 24). The outputs of these air-fuel ratio sensors 40 and 41 are also input through the corresponding AD converters 38 to the input port 36.

In the present embodiment, limit current type air-fuel ratio sensors are used, as the air-fuel ratio sensors 40 and 41. Therefore, the air-fuel ratio sensors 40 and 41, as shown in FIG. 2, are configured so that the output currents from the air-fuel ratio sensors 40 and 41 are greater, as the air-fuel ratio of the exhaust gas around the air-fuel ratio sensors 40 and 41 is higher (i.e., is leaner). In particular, the air-fuel ratio sensors 40 and 41 of the present embodiment are configured so that the output currents linearly (proportionally) change with respect to the air-fuel ratio of the exhaust gas around the air-fuel ratio sensors 40 and 41. Note that, in the present embodiment, limit current type air-fuel ratio sensors are used as the air-fuel ratio sensors 40 and 41, but air-fuel ratio sensors other than limit current type air-fuel ratio sensors may also be used so long as the output of the sensors changes according to the air-fuel ratio of the exhaust gas. Such an air-fuel ratio sensor includes, for example, an oxygen sensor which sharply changes in output near the stoichiometric air-fuel ratio without applying voltage between the electrodes forming the sensor, etc.

Furthermore, in the exhaust purification system of the present embodiment, an $NO_X$ sensor 46 detecting the $NO_X$ concentration of the exhaust gas flowing through the inside of the exhaust pipe 22 is arranged in the exhaust pipe 22. Therefore, the $NO_X$ sensor 46 is arranged at the downstream side of the upstream side exhaust purification catalyst 20 in the direction of flow of exhaust, and detects the $NO_X$ concentration of the exhaust gas flowing out from the upstream side exhaust purification catalyst 20 and flowing into the downstream side exhaust purification catalyst 24. The $NO_X$ sensor 46 is configured so that its output is larger as the $NO_X$ concentration in the exhaust gas is higher. The output of the $NO_X$ sensor 46 is input through a corresponding AD converter 38 to the input port 36. Note that, the $NO_X$ sensor 46 may also be configured to be attached to the upstream side casing 21 to detect the $NO_X$ concentration in the upstream side exhaust purification catalyst 20. Further, the $NO_X$ sensor 46 may also be formed integrally with the downstream side air-fuel ratio sensor 41.

Further, a load sensor 43 generating an output voltage proportional to the amount of depression of the accelerator pedal 42 is connected to the accelerator pedal 42. The output voltage of the load sensor 43 is input through a corresponding AD converter 38 to the input port 36. The crank angle sensor 44, for example, generates an output pulse every time the crank shaft rotates by 15 degrees. This output pulse is input to the input port 36. At the CPU 35, the engine speed is calculated from the output pulse of this crank angle sensor 44. On the other hand, the output port 37 is connected through corresponding drive circuits 45 to the spark plugs 10, fuel injectors 11, and throttle valve drive actuator 17. Note that, the ECU 31 functions as a control/diagnostic device for controlling the target air-fuel ratio of the exhaust gas flowing into the upstream side exhaust purification catalyst 20 and for diagnosing abnormality in the upstream side exhaust purification catalyst 20 based on the output of the $NO_X$ sensor 46.

The upstream side exhaust purification catalyst 20 and the downstream side exhaust purification catalyst 24 are three-way catalysts which have an oxygen storage ability. Specifically, the exhaust purification catalysts 20 and 24 are three-way catalysts which comprises a carrier made of ceramic on which a precious metal (for example, platinum Pt) having a catalyst effect and a substance having an oxygen storage ability (for example, ceria $CeO_2$) are carried. A three-way catalyst has the function of simultaneously purifying unburned HC, CO and $NO_X$ when the air-fuel ratio of the exhaust gas flowing into the three-way catalyst is maintained at the stoichiometric air-fuel ratio. In addition, when the exhaust purification catalysts 20 and 24 store a certain extent of oxygen, the unburned HC and CO and $NO_X$ are simultaneously purified even if the air-fuel ratio of the exhaust gas flowing into the exhaust purification catalysts 20 and 24 somewhat deviates from the stoichiometric air-fuel ratio to the rich side or lean side.

Accordingly, if the exhaust purification catalysts 20 and 24 have an oxygen storage ability, that is, if the oxygen storage amount of the exhaust purification catalysts 20 and 24 is less than the maximum storage oxygen amount, when the air-fuel ratio of the exhaust gas flowing into the exhaust purification catalysts 20, 24 is somewhat leaner than the stoichiometric air-fuel ratio, the excess oxygen contained in the exhaust gas is stored in the exhaust purification catalysts 20, 24. Therefore, the surfaces of the exhaust purification catalysts 20 and 24 are maintained at the stoichiometric air-fuel ratio. As a result, on the surfaces of the exhaust purification catalysts 20 and 24, the unburned HC, CO and $NO_X$ are simultaneously purified. At this time, the air-fuel ratio of the exhaust gas flowing out from the exhaust purification catalysts 20 and 24 is the stoichiometric air-fuel ratio.

On the other hand, if exhaust purification catalysts 20 and 24 can release oxygen, that is, the oxygen storage amount of the exhaust purification catalysts 20 and 24 is more than zero, when the air-fuel ratio of the exhaust gas flowing into the exhaust purification catalysts 20, 24 is somewhat richer than the stoichiometric air-fuel ratio, the oxygen which is insufficient for reducing the unburned HC and CO contained in the exhaust gas, is released from the exhaust purification catalysts 20 and 24. Therefore, the surfaces of the exhaust purification catalysts 20 and 24 are maintained at the stoichiometric air-fuel ratio. As a result, on the surfaces of the exhaust purification catalysts 20 and 24, the unburned HC, CO and $NO_X$ are simultaneously purified. At this time, the air-fuel ratio of the exhaust gas flowing out from the exhaust purification catalysts 20 and 24 is the stoichiometric air-fuel ratio.

In this way, when the exhaust purification catalysts 20 and 24 store a certain extent of oxygen, even if the air-fuel ratio of the exhaust gas flowing into the exhaust purification catalysts 20 and 24 deviates somewhat from the stoichiometric air-fuel ratio to the rich side or lean side, the unburned HC, CO and $NO_X$ are simultaneously purified and the air-fuel ratio of the exhaust gas flowing out from the exhaust purification catalysts 20 and 24 is the stoichiometric air-fuel ratio.

<Basic Air-Fuel Ratio Control>

Next, the basic air-fuel ratio control in the exhaust purification system of the internal combustion engine according to the present embodiment, will be summarized. In the air-fuel ratio control in the present embodiment, feedback control is performed based on the output air-fuel ratio of the upstream side air-fuel ratio sensor 40 to control the fuel injection amount from the fuel injector 11 so that the output air-fuel ratio of the upstream side air-fuel ratio sensor 40 becomes the target air-fuel ratio. That is, in the air-fuel ratio control in the present embodiment, feedback control is performed based on the output air-fuel ratio of the upstream side air-fuel ratio sensor 40 so that the air-fuel ratio of the exhaust gas flowing into the upstream side exhaust purification catalyst 20 becomes the target air-fuel ratio. Note that, the "output air-fuel ratio" means the air-fuel ratio which corresponds to the output value of the air-fuel ratio sensor.

Further, in the air-fuel ratio control of the present embodiment, target air-fuel ratio is set based on the output air-fuel ratio of the downstream side air-fuel ratio sensor 41, etc. Specifically, when the output air-fuel ratio of the downstream side air-fuel ratio sensor 41 becomes a rich air-fuel ratio, the target air-fuel ratio is set to a lean set air-fuel ratio. As a result, the air-fuel ratio of exhaust gas flowing into the upstream side exhaust purification catalyst 20 also becomes the lean set air-fuel ratio. In this case, "lean set air-fuel ratio" is a predetermined constant air-fuel ratio which is leaner than the stoichiometric air-fuel ratio (air-fuel ratio serving as center of control) by a certain extent, and, for example, is 14.65 to 20, preferably 14.65 to 18, more preferably 14.65 to 16 or so. Further, the lean set air-fuel ratio can be expressed as an air-fuel ratio acquired by adding a positive air-fuel correction amount to an air-fuel ratio serving as a control center (in the present embodiment, the stoichiometric air-fuel ratio). In addition, in the present embodiment, when the output air-fuel ratio of the downstream side air-fuel ratio sensor 41 becomes a rich judged air-fuel ratio (for example, 14.55), which is slightly richer than the stoichiometric air-fuel ratio, or less, it is judged that the output air-fuel ratio of the downstream side air-fuel ratio sensor 41 has become the rich air-fuel ratio.

If the target air-fuel ratio is changed to the lean set air-fuel ratio, the oxygen excess/deficiency of the exhaust gas which flows into the upstream side exhaust purification catalyst 20 is cumulatively added. The "oxygen excess/deficiency" means an amount of the oxygen which is excessive or the oxygen which is deficient (excess HC, CO, etc., (below, referred to as unburned gas)) when trying to make the air-fuel ratio of the exhaust gas which flows into the upstream side exhaust purification catalyst 20 the stoichiometric air-fuel ratio. In particular, when the target air-fuel ratio is the lean set air-fuel ratio, the exhaust gas which flows into the upstream side exhaust purification catalyst 20 is excessive in oxygen. This excess oxygen is stored in the upstream side exhaust purification catalyst 20. Therefore, the cumulative value of the oxygen excess/deficiency (below, also referred to as the "cumulative oxygen excess/deficiency") can be said to express the estimated value of the oxygen storage amount OSA of the upstream side exhaust purification catalyst 20.

Note that, the oxygen excess/deficiency is calculated based on the output air-fuel ratio of the upstream side air-fuel ratio sensor 40, and the estimated value of the intake air amount to the inside of the combustion chamber 5 which is calculated based on the output of the air flow meter 39, etc., or the fuel feed amount of the fuel injector 11, etc. Specifically, the oxygen excess/deficiency OED is, for example, calculated by the following formula (1):

$$OED = 0.23 \times Q_i \times (AFup - AFR) \quad (1)$$

where 0.23 indicates the concentration of oxygen in the air, $Q_i$ indicates the amount of fuel injection, AFup indicates the output air-fuel ratio of the upstream side air-fuel ratio sensor 40, and AFR indicates an air-fuel ratio serving as control center (in the present embodiment, basically stoichiometric air-fuel ratio).

If the cumulative oxygen excess/deficiency acquired by cumulatively adding the thus calculated oxygen excess/deficiency becomes the predetermined switching reference value (which corresponds to a predetermined switching reference storage amount Cref) or more, i.e., the target air-fuel ratio which had up to then been the lean set air-fuel ratio is set to the rich set air-fuel ratio. The rich set air-fuel ratio is a predetermined air-fuel ratio which is a certain degree richer than the stoichiometric air-fuel ratio (the air-fuel ratio serving as control center), and is for example 12 to 14.58, preferably 13 to 14.57, more preferably 14 to 14.55 or so. Further, the rich set air-fuel ratio can be expressed as an air-fuel ratio acquired by adding a negative air-fuel ratio correction amount to an air-fuel ratio serving as a control center (in the present embodiment, the stoichiometric air-fuel ratio). Note that, in the present embodiment, the difference of the rich set air-fuel ratio from the stoichiometric air-fuel ratio (rich degree) is made the difference of the lean set air-fuel ratio from the stoichiometric air-fuel ratio (lean degree) or less.

Then, when the output air-fuel ratio of the downstream side air-fuel ratio sensor 41 again becomes the rich judged air-fuel ratio or less, the target air-fuel ratio is again made the lean set air-fuel ratio. Then, a similar operation is repeated. In this way, in the present embodiment, the target air-fuel ratio of the exhaust gas flowing into the upstream side exhaust purification catalyst 20 is alternately and repeatedly set to the lean set air-fuel ratio and the rich set air-fuel ratio. In other words, in the present embodiment, the air-fuel ratio of the exhaust gas flowing into the upstream side exhaust purification catalyst 20 is alternately switched between a rich air-fuel ratio and a lean air-fuel ratio.

<Explanation of Air Fuel Ratio Control Using Time Chart>

Figure 3:
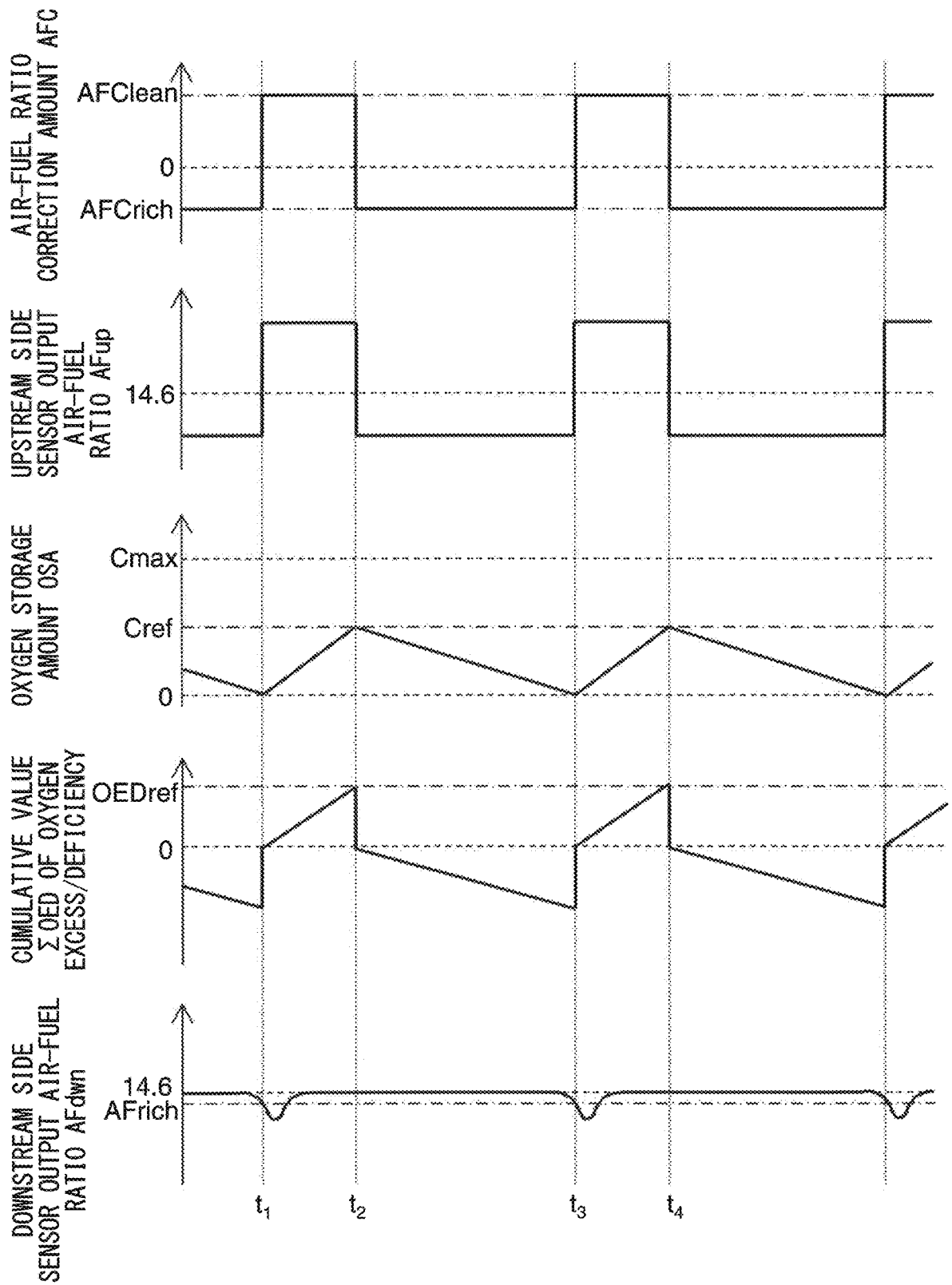
FIG. 3 is a time chart showing a change of an oxygen storage amount of an upstream side exhaust purification catalyst, etc., at the time of operation of an internal combustion engine.

Referring to FIG. 3, the operation explained as above will be explained in detail. FIG. 3 is a time chart of the air-fuel ratio correction amount AFC, the output air-fuel ratio AFup of the upstream side air-fuel ratio sensor 40, the oxygen storage amount OSA of the upstream side exhaust purification catalyst 20, the cumulative oxygen excess/deficiency ΣOED, and the output air-fuel ratio AFdwn of the downstream side air-fuel ratio sensor 41, when performing the air-fuel ratio control of the present embodiment.

Note that the air-fuel ratio correction amount AFC is a correction amount relating to the target air-fuel ratio of the exhaust gas flowing into the upstream side exhaust purification catalyst 20. When the air-fuel ratio correction amount AFC is 0, the target air-fuel ratio is set to an air-fuel ratio which is equal to the air-fuel ratio serving as the control center (below, referred to as the "control center air-fuel ratio") (in the present embodiment, the stoichiometric air-fuel ratio). When the air-fuel ratio correction amount AFC is a positive value, the target air-fuel ratio is an air-fuel ratio leaner than the control center air-fuel ratio (in the present embodiment, the lean air-fuel ratio), while when the air-fuel ratio correction amount AFC is a negative value, the target air-fuel ratio is an air-fuel ratio richer than the control center air-fuel ratio (in the present embodiment, rich air-fuel ratio). Further, the "control center air-fuel ratio" means the air-fuel ratio to which of the air-fuel ratio correction amount AFC is added in accordance with the engine operating state, that is, the air-fuel ratio which is the reference when changing the target air-fuel ratio in accordance with the air-fuel ratio correction amount AFC.

Figure 5:
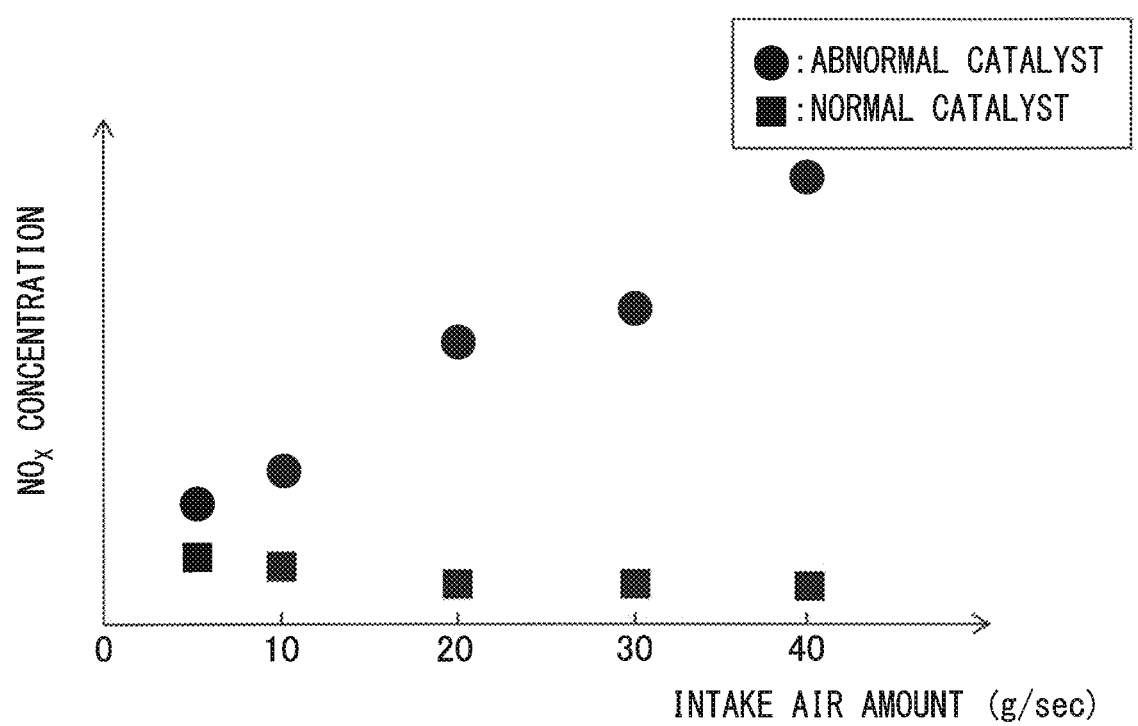
FIG. 5 is a view showing a relationship between an intake air amount and an $NO_X$ concentration detected by an $NO_X$ sensor, when a target air-fuel ratio is a rich air-fuel ratio.

In the example shown in FIG. 5, in the state before the time $t_1$, the air-fuel ratio correction amount AFC is set to the rich set correction amount AFCrich (corresponding to rich set air-fuel ratio). That is, the target air-fuel ratio is set to the rich air-fuel ratio Along with this, the output air-fuel ratio of the upstream side air-fuel ratio sensor 40 is the rich air-fuel ratio. Unburned gas, etc., contained in the exhaust gas flowing into the upstream side exhaust purification catalyst 20 is purified in the upstream side exhaust purification catalyst 20. Along with this, the oxygen storage amount OSA of the upstream side exhaust purification catalyst 20 gradually decreases. Since due to the purification in the upstream side exhaust purification catalyst 20, unburned gas, etc., is not contained in the exhaust gas flowing out from the upstream side exhaust purification catalyst 20, the output air-fuel ratio AFdwn of the downstream side air-fuel ratio sensor 41 is substantially the stoichiometric air-fuel ratio. Since the air-fuel ratio of the exhaust gas flowing into the upstream side exhaust purification catalyst 20 is a rich air-fuel ratio, the $NO_X$ discharging amount from the upstream side exhaust purification catalyst 20 is small.

If the oxygen storage amount OSA of the upstream side exhaust purification catalyst 20 gradually decreases, the oxygen storage amount OSA approaches zero. Along with this, a part of the unburned gas flowing into the upstream side exhaust purification catalyst 20 starts to flow out without being purified by the upstream side exhaust purification catalyst 20. As a result, the output air-fuel ratio AFdown of the downstream side air-fuel ratio sensor 41 gradually falls, and at the time $t_1$, the output air-fuel ratio AFdwn of the downstream side air-fuel ratio sensor 41 reaches the rich judged air-fuel ratio AFrich.

In the present embodiment, if the output air-fuel ratio AFdwn of the downstream side air-fuel ratio sensor 41 becomes the rich judged air-fuel ratio AFrich or less, in order to make the oxygen storage amount OSA increase, the air-fuel ratio correction amount AFC is switched to the lean set correction amount AFClean (corresponding to lean set air-fuel ratio). Further, at this time, the cumulative oxygen excess/deficiency ΣOED is reset to zero.

Note that, in the present embodiment, the air-fuel ratio correction amount AFC is switched when the output air-fuel ratio AFdwn of the downstream side air-fuel ratio sensor 41 reaches the rich judged air-fuel ratio AFrich. This is because even if the oxygen storage amount OSA of the upstream side exhaust purification catalyst 20 is sufficient, sometimes the air-fuel ratio of the exhaust gas flowing out from the upstream side exhaust purification catalyst 20 deviates very slightly from the stoichiometric air-fuel ratio. Conversely speaking, the rich judged air-fuel ratio is set to an air-fuel ratio which the air-fuel ratio of the exhaust gas flowing out from the upstream side exhaust purification catalyst 20 never reaches when the oxygen storage amount of the upstream side exhaust purification catalyst 20 is sufficient.

If switching the target air-fuel ratio to the lean air-fuel ratio at the time $t_1$, the air-fuel ratio of the exhaust gas flowing into the upstream side exhaust purification catalyst 20 changes from the rich air-fuel ratio to the lean air-fuel ratio. If the air-fuel ratio of the exhaust gas flowing into the upstream side exhaust purification catalyst 20 changes to the lean air-fuel ratio at the time $t_1$, the oxygen storage amount OSA of the upstream side exhaust purification catalyst 20 increases. Further, along with this, the cumulative oxygen excess/deficiency ΣOED also gradually increases.

Therefore, the air-fuel ratio of the exhaust gas flowing out from the upstream side exhaust purification catalyst 20 changes to the stoichiometric air-fuel ratio, and the output air-fuel ratio AFdwn of the downstream side air-fuel ratio sensor 41 returns to the stoichiometric air-fuel ratio. At this time, the air-fuel ratio of the exhaust gas flowing into the upstream side exhaust purification catalyst 20 is the lean air-fuel ratio, but there is sufficient leeway in the oxygen storage ability of the upstream side exhaust purification catalyst 20, and therefore the oxygen in the inflowing exhaust gas is stored in the upstream side exhaust purification catalyst 20 and $NO_X$ is removed by reduction. Therefore, the exhaust of $NO_X$ from the upstream side exhaust purification catalyst 20 is small.

Then, if the upstream side exhaust purification catalyst 20 increases in the oxygen storage amount OSA, at the time $t_2$, the oxygen storage amount OSA of the upstream side exhaust purification catalyst 20 reaches the switching reference storage amount Cref. Therefore, the cumulative oxygen excess/deficiency ΣOED reaches the switching reference value OEDref which corresponds to the switching reference storage amount Cref. In the present embodiment, if the cumulative oxygen excess/deficiency ΣOED becomes the switching reference value OEDref or more, the storage of oxygen in the upstream side exhaust purification catalyst 20 is suspended by switching the air-fuel ratio correction amount AFC to the rich set correction amount AFCrich. Therefore, the target air-fuel ratio is made the rich air-fuel ratio. Further, at this time, the cumulative oxygen excess/deficiency ΣOED is reset to 0.

Note that the switching reference storage amount Cref is set to an amount sufficiently small so that the oxygen storage amount OSA does not reach the maximum storable oxygen amount Cmax even if unintentional deviation in air-fuel ratio due to abrupt acceleration of the vehicle, etc., occurs. For example, the switching reference storage amount Cref is made ¾ or less of the maximum storable oxygen amount Cmax before the upstream side exhaust purification catalyst 20 is used, preferably ½ or less thereof, more preferably ⅕ or less thereof. As a result, the air-fuel ratio correction amount AFC is switched to the rich set correction amount AFCrich before the output air-fuel ratio AFdown of the downstream side air-fuel ratio sensor 41 reaches a lean judged air-fuel ratio which is slightly leaner than the stoichiometric air-fuel ratio (for example, 14.65, a lean air-fuel ratio wherein the difference from the stoichiometric air-fuel ratio is almost the same as the difference between the rich judged air-fuel ratio and the stoichiometric air-fuel ratio).

At the time $t_2$, if the target air-fuel ratio is switched to the rich set air-fuel ratio, the air-fuel ratio of the exhaust gas flowing into the upstream side exhaust purification catalyst 20 changes from the lean air-fuel ratio to the rich air-fuel ratio. Since, the exhaust gas flowing into the upstream side exhaust purification catalyst 20 contains unburned gas, etc., the upstream side exhaust purification catalyst 20 gradually decreases in oxygen storage amount OSA. At this time, $NO_X$ amount exhausted from the upstream side exhaust purification catalyst 20 is small.

The oxygen storage amount OSA of the upstream side exhaust purification catalyst 20 gradually decreases, and at the time $t_4$, in a similar way to time $t_1$, the output air-fuel ratio AFdwn of the downstream side air-fuel ratio sensor 41 reaches the rich judged air-fuel ratio AFrich. Due to this, the air-fuel ratio correction amount AFC is switched to the lean set correction amount AFClean. Then, the cycle of the above mentioned times $t_1$ to $t_4$ is repeated.

As will be understood from the above explanation, according to the present embodiment, it is possible to constantly suppress the amount of exhaust of $NO_X$ from the upstream side exhaust purification catalyst 20. Further, the cumulative time period when calculating the cumulative oxygen excess/deficiency ΣOED is short, therefore compared with the case of cumulatively adding the values over a long time period, error in calculation is kept from occurring. For this reason, error in calculation of the cumulative oxygen excess/deficiency ΣOED is kept from causing the $NO_X$ to end up being exhausted.

Further, in general, if the oxygen storage amount of the exhaust purification catalyst is maintained constant, the oxygen storage ability of the exhaust purification catalyst falls. That is, to maintain the oxygen storage ability of the exhaust purification catalyst high, the oxygen storage amount of the exhaust purification catalyst has to fluctuate. As opposed to this, according to the present embodiment, as shown in FIG. 3, the oxygen storage amount OSA of the upstream side exhaust purification catalyst 20 constantly fluctuates up and down, therefore the oxygen storage ability is kept from falling.

Note that, in the above embodiment, during the times $t_1$ to $t_2$, the air-fuel ratio correction amount AFC is maintained at the lean set correction amount AFClean. However, during this time period, the air-fuel ratio correction amount AFC does not necessarily have to be maintained constant. It may be set to fluctuate, such as to gradually decrease. Similarly, in the above embodiment, during the times $t_2$ to $t_3$, the air-fuel ratio correction amount AFC is maintained at the rich set correction amount AFCrich. However, during this time period, the air-fuel ratio correction amount AFC does not necessarily have to be maintained constant. It may be set to fluctuate, such as to gradually increase.

Note that, in the present embodiment, the air-fuel ratio correction amount AFC is set, that is, the target air-fuel ratio is set, by the ECU 31. Therefore, the ECU 31 set the target air-fuel ratio of the exhaust gas flowing into the upstream side exhaust purification catalyst 20 to a lean air-fuel ratio, when the air-fuel ratio detected by the downstream side air-fuel ratio sensor 41 becomes the rich judged air-fuel ratio or less, until the oxygen storage amount OSA of the upstream side exhaust purification catalyst 20 is estimated to have become the switching reference storage amount Cref or more. In addition, the ECU 31 set the target air-fuel ratio to a rich air-fuel ratio, when the oxygen storage amount OSA of the upstream side exhaust purification catalyst 20 is estimated to have become the switching reference storage amount Cref or more, until the air-fuel ratio detected the downstream side air-fuel ratio sensor 41 becomes a rich judged air-fuel ratio or less without the oxygen storage amount OSA reaching the maximum storable oxygen amount Cmax.

More simply speaking, in the present embodiment, the ECU 31 can be said to switch the target air-fuel ratio (that is, the air-fuel ratio of the exhaust gas flowing into the upstream side exhaust purification catalyst 20) to the lean air-fuel ratio when the air-fuel ratio detected by the downstream side air-fuel ratio sensor 41 becomes the rich judged air-fuel ratio or less, and to switch the target air-fuel ratio (that is, the air-fuel ratio of the exhaust gas flowing into the upstream side exhaust purification catalyst 20) to the rich air-fuel ratio when the oxygen storage amount OSA of the upstream side exhaust purification catalyst 20 becomes the switching reference storage amount Cref or more.

<<Flow Chart of Control for Setting Air-Fuel Ratio Correction Amount>>

Figure 4:
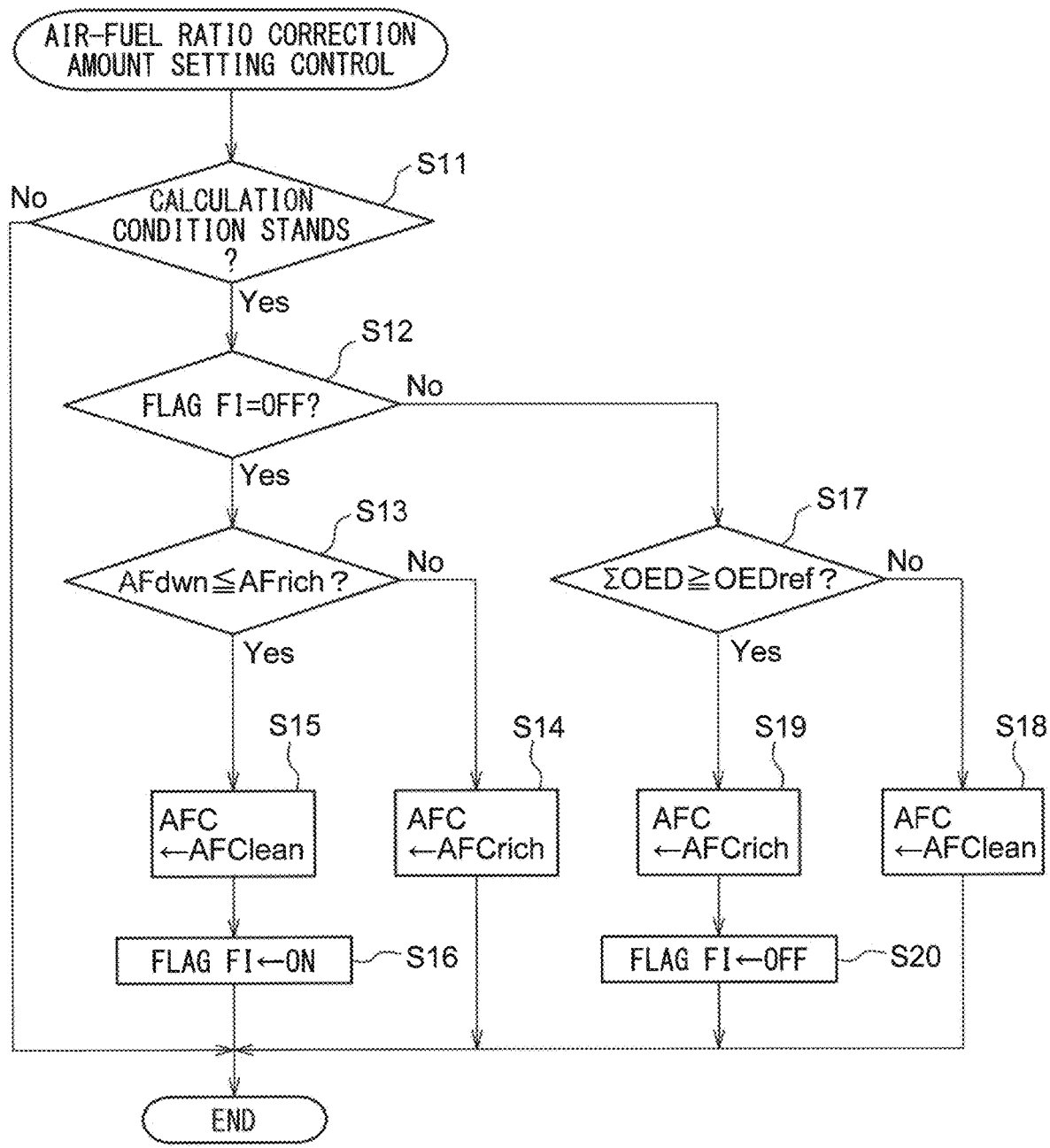
FIG. 4 is a flow chart showing a control routine of control for setting an air-fuel ratio correction amount.

FIG. 4 is a flow chart showing the control routine of control for setting the air-fuel ratio correction amount AFC. The control routine shown in the figure is performed by interruption every certain time interval (for example, 4 msec).

As shown in FIG. 4, first, at step S11, it is judged if the condition for calculation of the air-fuel ratio correction amount AFC stands. The case where the condition for calculation of the air-fuel ratio correction amount AFC stands is, for example, in the case where normal operation is performed, in which a feedback control is performed, such as in the case where fuel cut control is not performed. When it is judged at step S11 that the condition for calculation of the air-fuel ratio correction amount AFC stands, the routine proceeds to step S12.

Next, at step S12, it is judged if the lean set flag Fl is set to OFF. The lean set flag Fl is a flag which is set to ON when the air-fuel ratio correction amount AFC is set to the lean set correction amount AFClean, and is set to OFF otherwise. When it is judged at step S12 that the lean set flag Fl is set to OFF, the routine proceeds to step S13. At step S13, it is judged if the output air-fuel ratio AFdwn of the downstream side air-fuel ratio sensor 41 is the rich judged air-fuel ratio AFrich or less. If it is judged that the output air-fuel ratio AFdwn of the downstream side air-fuel ratio sensor 41 is larger than the rich judged air-fuel ratio AFrich, the routine proceeds to step 14. At step S14, the air-fuel correction amount AFC is maintained to the rich set correction amount AFCrich, and the control routine is ended.

On the other hand, if the oxygen storage amount OSA of the upstream side exhaust purification catalyst 20 decreases and thus the air-fuel ratio of the exhaust gas flowing out from the upstream side exhaust purification catalyst 20 falls, it is judged that the output air-fuel ratio AFdwn of the downstream side air-fuel ratio sensor 41 is the rich judged air-fuel ratio AFrich or less at step S13. In this case, the routine proceeds to step S15, and the air-fuel ratio correction amount AFC is switched to the lean set correction amount AFClean. Next, at step S16, the lean set flag Fl is set to ON, then the control routine is ended.

If the lean set flag Fl is set to ON, in the next control routine, at step S12, it is judged that the lean set flag Fl is not set to OFF, and thus the routine proceeds to step S17. In step S17, it is judged if the cumulative oxygen excess/deficiency ΣOED from the time when the air-fuel ratio correction amount AFC was switched to the lean set correction amount AFClean is lower than the switching reference value OEDref. If it is judged that the cumulative oxygen excess/deficiency ΣOED is lower than the switching reference value OEDref, the routine proceeds to step S18, and the air-fuel ratio correction amount AFC is continuously set to the lean set correction amount AFClean and is maintained. Then, the control routine is ended. On the other hand, if the oxygen storage amount of the upstream side exhaust purification catalyst 20 increases, finally, it is judged at step S17 that the cumulative oxygen excess/deficiency ΣOED is equal to or greater than the switching reference value OEDref, and thus the routine proceeds to step S19. At step S19, the air-fuel ratio correction amount AFC is switched to the rich set correction amount AFCrich. Next, at step S20, the lean set flag Fl is reset to OFF, and then the control routine is ended.

<<Detection of Deterioration of Catalyst>>

In this regard, the exhaust purification catalysts 20 and 24 configured as explained above greatly deteriorate if the exhaust purification catalysts 20 and 24 are used over long time periods or the exhaust purification catalysts 20 and 24 are exposed to high temperatures over long time periods. Specifically, the catalyst precious metal carried on and dispersed in particulate state at the carriers of the exhaust purification catalysts 20 and 24, aggregates by sintering and falls in catalyst activity.

If the catalyst precious metal falls in activity due to sintering in this way, even if unburned HC, oxygen or $NO_X$ is present around the catalyst precious metal, these components can no longer sufficiently react. That is, if the exhaust purification catalysts 20 and 24 greatly deteriorate, the ability to purify the exhaust gas flowing into the exhaust purification catalysts 20 and 24 falls.

In this regard, since the upstream side exhaust purification catalyst 20 has an oxygen storing ability as explained above, both when the target air-fuel ratio is a rich air-fuel ratio and the target air-fuel ratio is a lean air-fuel ratio, the amount of discharge of $NO_X$ from the upstream side exhaust purification catalyst 20 can be suppressed.

That is, when the target air-fuel ratio is a rich air-fuel ratio and thus the air-fuel ratio of the exhaust gas flowing into the upstream side exhaust purification catalyst 20 is a rich air-fuel ratio, the exhaust gas discharged from the engine body 1 contains large amounts of unburned HC and CO and small amounts of $NO_X$ and oxygen. For this reason, the $NO_X$ in the exhaust gas flowing into the upstream side exhaust purification catalyst 20 reacts with the unburned HC and CO due to the action of the catalyst precious metal, and thus is reduced and removed. As a result, $NO_X$ concentration in the exhaust gas flowing out from the upstream side exhaust purification catalyst 20 can be maintained low.

On the other hand, when the target air-fuel ratio is a lean air-fuel ratio and thus the air-fuel ratio of the exhaust gas flowing into the upstream side exhaust purification catalyst 20 is a lean air-fuel ratio, the exhaust gas discharged from the engine body 1 contains large amounts of oxygen and $NO_X$ and small amounts of unburned HC and CO. If exhaust gas containing large amounts of oxygen and $NO_X$ flows into the upstream side exhaust purification catalyst 20, the oxygen in the exhaust gas is stored in the upstream side exhaust purification catalyst 20. As a result, $NO_X$ remains in the exhaust gas. The $NO_X$ remaining in the exhaust gas reacts with the unburned HC or CO contained in the exhaust gas due to the action of the catalyst precious metal and thus is reduced and removed. As a result, it is possible to maintain the $NO_X$ concentration in the exhaust gas flowing out from the upstream side exhaust purification catalyst 20 low.

However, if the upstream side exhaust purification catalyst 20 deteriorates, that is, if it falls in activity due to sintering of the catalyst precious metal, the upstream side exhaust purification catalyst 20 can no longer sufficiently react the unburned HC, CO, and $NO_X$ in the inflowing exhaust gas. As a result, if the upstream side exhaust purification catalyst 20 deteriorates, even if the upstream side exhaust purification catalyst 20 stores oxygen, if the target air-fuel ratio is set to a rich air-fuel ratio and thus the air-fuel ratio of the exhaust gas flowing into the upstream side exhaust purification catalyst 20 is a rich air-fuel ratio, $NO_X$ will flow out from the upstream side exhaust purification catalyst 20. Similarly, even if in a state where the upstream side exhaust purification catalyst 20 can store oxygen, if the target air-fuel ratio is set to the lean air-fuel ratio and thus the air-fuel ratio of the exhaust gas flowing into the upstream side exhaust purification catalyst 20 is a lean air-fuel ratio, $NO_X$ will flow out from the upstream side exhaust purification catalyst 20.

Conversely speaking, when setting the target air-fuel ratio of the exhaust gas flowing into the upstream side exhaust purification catalyst 20 to a rich air-fuel ratio and the oxygen storage amount OSA of the upstream side exhaust purification catalyst 20 is not near zero (that is, when due to the oxygen storage ability of the upstream side exhaust purification catalyst 20, the air-fuel ratio of the exhaust gas flowing out from the upstream side exhaust purification catalyst 20 is near the stoichiometric air-fuel ratio), if the amount of $NO_X$ flowing out from the upstream side exhaust purification catalyst 20 is great, it can be judged that the upstream side exhaust purification catalyst 20 is greatly deteriorating. Similarly, when setting the target air-fuel ratio of the exhaust gas flowing into the upstream side exhaust purification catalyst 20 to a lean air-fuel ratio and the oxygen storage amount OSA of the upstream side exhaust purification catalyst 20 is not near the maximum oxygen storage capacity Cmax (that is, when due to the oxygen storage ability of the upstream side exhaust purification catalyst 20, the air-fuel ratio of the exhaust gas flowing out from the upstream side exhaust purification catalyst 20 is near the stoichiometric air-fuel ratio), if the amount of $NO_X$ flowing out from the upstream side exhaust purification catalyst 20 is great, it can be judged that the upstream side exhaust purification catalyst 20 is greatly deteriorating.

<<Relationship of Rich Failure and Detection of Deterioration>>

In this regard, as explained above, in the present embodiment, if the output air-fuel ratio AFdwn of the downstream side air-fuel ratio sensor 41 becomes a rich judged air-fuel ratio or less in the state of setting the target air-fuel ratio at a rich air-fuel ratio, the target air-fuel ratio is switched from a rich air-fuel ratio to a lean air-fuel ratio (time $t_1$ or $t_3$ of FIG. 3). Therefore, when the target air-fuel ratio is switched from a rich air-fuel ratio to a lean air-fuel ratio, the oxygen storage amount OSA of the upstream side exhaust purification catalyst 20 is substantially zero. In addition, a certain extent of time is required from when the target air-fuel ratio is switched from a rich air-fuel ratio to a lean air-fuel ratio to when exhaust gas of a lean air-fuel ratio actually flows into the upstream side exhaust purification catalyst 20. Therefore, from when the target air-fuel ratio is switched from the rich air-fuel ratio to the lean air-fuel ratio to when exhaust gas of a lean air-fuel ratio flows into the upstream side exhaust purification catalyst 20, in the state where the oxygen storage amount OSA of the upstream side exhaust purification catalyst 20 is substantially zero, exhaust gas of a rich air-fuel ratio containing unburned HC or CO temporarily flows into the upstream side exhaust purification catalyst 20.

If, in the state where the oxygen storage amount OSA of the upstream side exhaust purification catalyst 20 is substantially zero in this way, exhaust gas of a rich air-fuel ratio temporarily flows into the upstream side exhaust purification catalyst 20, unburned HC or CO will deposit on the catalyst precious metal of the upstream side exhaust purification catalyst 20. If unburned HC or CO deposits on the catalyst precious metal, the surface area of the catalyst precious metal able to provide the catalytic action will decrease and as a result the catalytic action of the catalyst precious metal will drop (below, such a phenomenon referred to as "HC poisoning"). Therefore, within the certain period from when the target air-fuel ratio is switched from the rich air-fuel ratio to the lean air-fuel ratio, the catalytic action of the catalyst precious metal falls.

Then, the unburned HC or CO deposited on the surface of the catalyst precious metal reacts with the oxygen in the exhaust gas and thus is gradually desorbed from the catalyst precious metal, if an exhaust gas of a lean air-fuel ratio continues to flow into the upstream side exhaust purification catalyst 20. Along with such desorption of unburned HC or CO from the catalyst precious metal, the catalytic action of the catalyst precious metal will also recover and thereby HC poisoning will be resolved.

However, if the above-mentioned HC poisoning occurs, the catalytic action of the catalyst precious metal falls, and therefore even if the upstream side exhaust purification catalyst 20 is not greatly deteriorated, the amount of $NO_X$ flowing out from the upstream side exhaust purification catalyst 20 is great. Therefore, as explained above, if diagnosing abnormality in the upstream side exhaust purification catalyst 20 in accordance with the amount of $NO_X$ flowing out from the upstream side exhaust purification catalyst 20, there is the possibility that it is judged that the upstream side exhaust purification catalyst 20 is greatly deteriorating.

FIG. 5 is a view showing the relationship between an intake air amount and an $NO_X$ concentration detected by the $NO_X$ sensor 46 in the case where the target air-fuel ratio is the rich air-fuel ratio (for example, times $t_2$ to $t_3$ in FIG. 3). The square marks in FIG. 5 show the relationship in the case where the upstream side exhaust purification catalyst 20 is normal (catalyst which does not deteriorate so much that the purification ability greatly falls), while the circle marks show the relationship in the case where the upstream side exhaust purification catalyst 20 is abnormal (so-called "criteria catalyst" which deteriorates to such an extent that the purification ability greatly falls).

As will be understood from FIG. 5, if the target air-fuel ratio is a rich air-fuel ratio, that is, if the air-fuel ratio of the exhaust gas flowing into the upstream side exhaust purification catalyst 20 is a rich air-fuel ratio, regardless of the intake air amount, the amount of $NO_X$ detected by the $NO_X$ sensor 46 will be greater when the upstream side exhaust purification catalyst 20 is abnormal, compared to when it is normal. This is because, as explained above, when the upstream side exhaust purification catalyst 20 greatly deteriorates, the amount of $NO_X$ flowing out from the upstream side exhaust purification catalyst 20 increases. Note that, in the case where the upstream side exhaust purification catalyst 20 is abnormal, the $NO_X$ concentration detected by the $NO_X$ sensor 46 increases as the intake air amount increases. This is because the $NO_X$ flowing out from the upstream side exhaust purification catalyst 20 per unit time increases along with the increase of the intake air amount. On the other hand, if the upstream side exhaust purification catalyst 20 is normal, even if the intake air amount increases, the $NO_X$ is purified by the upstream side exhaust purification catalyst 20, and therefore the $NO_X$ concentration detected by the $NO_X$ sensor 46 is maintained low.

Figure 6:
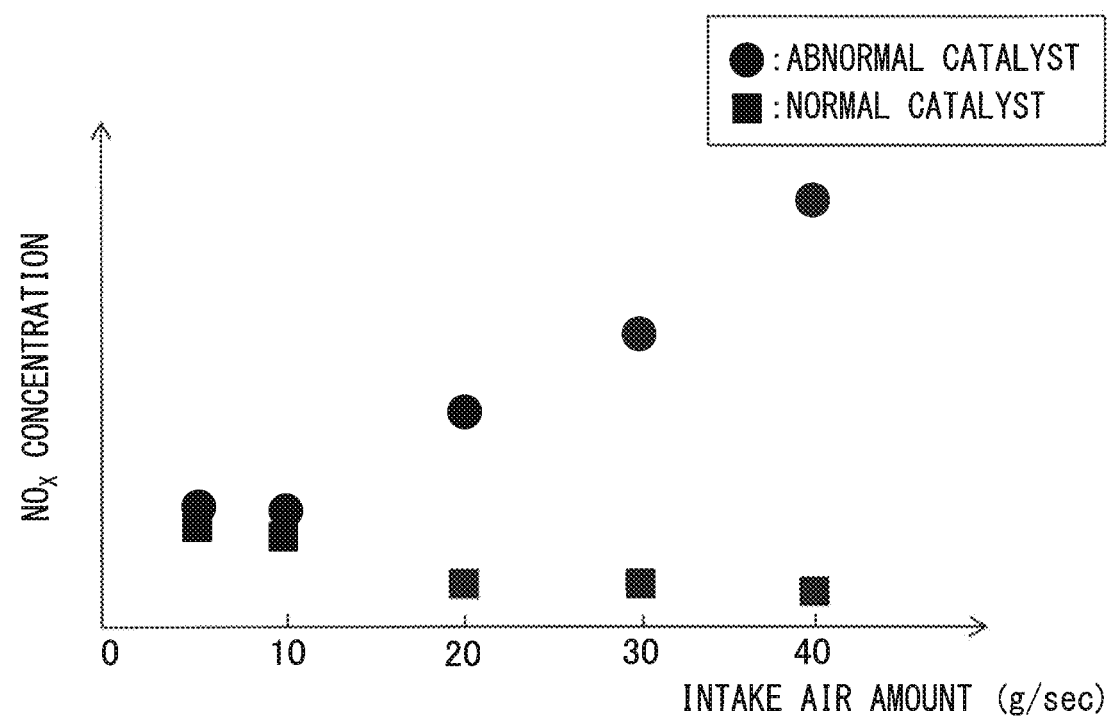
FIG. 6 is a view showing a relationship between an intake air amount and an $NO_X$ concentration detected by an $NO_X$ sensor, when a target air-fuel ratio is a lean air-fuel ratio.

On the other hand, FIG. 6 is a view showing the relationship between the intake air amount and the $NO_X$ concentration detected by the $NO_X$ sensor 46 in the case where the target air-fuel ratio is the lean air-fuel ratio (for example, times $t_1$ to $t_2$ in FIG. 3). The square marks in FIG. 6 show the relationship in the case where the upstream side exhaust purification catalyst 20 is normal, while the circle marks show the relationship in the case where the upstream side exhaust purification catalyst 20 is abnormal. FIG. 6 shows the relationship between the intake air amount and the $NO_X$ concentration detected by the $NO_X$ sensor 46, after the downstream side air-fuel ratio sensor 41 becomes a rich judged air-fuel ratio or less in the state where the target air-fuel ratio is made a rich air-fuel ratio and thus the target air-fuel ratio is switched to a lean air-fuel ratio.

As will be understood from FIG. 6, when the target air-fuel ratio is a lean air-fuel ratio, that is, when the air-fuel ratio of the exhaust gas flowing into the upstream side exhaust purification catalyst 20 is a lean air-fuel ratio, if the intake air amount is small, the amount of $NO_X$ detected by the $NO_X$ sensor 46 will not change much at all between when the upstream side exhaust purification catalyst 20 is abnormal and when it is normal. This is because, as explained above, even if the upstream side exhaust purification catalyst 20 greatly deteriorates, at the point of time when switching the target air-fuel ratio to a lean air-fuel ratio, the upstream side exhaust purification catalyst 20 is poisoned by HC. Therefore, when the target air-fuel ratio is a lean air-fuel ratio, if diagnosing abnormality in the upstream side exhaust purification catalyst 20 based on the $NO_X$ concentration detected by the $NO_X$ sensor 46, even if the upstream side exhaust purification catalyst 20 does not greatly deteriorated, it is judged that the upstream side exhaust purification catalyst 20 is abnormal.

On the other hand, as will be understood from FIG. 6, even if the target air-fuel ratio is a lean air-fuel ratio, when the intake air amount is large, the amount of $NO_X$ detected by the $NO_X$ sensor 46 will be greater when the upstream side exhaust purification catalyst 20 is abnormal, compared to when it is normal. This is believed to be because if the intake air amount is large, the amount of oxygen flowing into the upstream side exhaust purification catalyst 20 will also be great and, as a result, HC poisoning is quickly resolved. Therefore, even if the target air-fuel ratio is the rich air-fuel ratio, if the intake air amount is large, abnormality in the upstream side exhaust purification catalyst 20 can be suitably diagnosed based on the $NO_X$ concentration detected by the $NO_X$ sensor 46.

<<Control According to First Embodiment>>

In the present embodiment, abnormality in the upstream side exhaust purification catalyst 20 is diagnosed based on the $NO_X$ concentration detected by the $NO_X$ sensor 46. In particular, in the present embodiment, if the $NO_X$ concentration Cnox detected by the $NO_X$ sensor 46 is a predetermined judgement reference value Cnoxref or more, it is judged that the degree of deterioration of the upstream side exhaust purification catalyst 20 accompanying sintering of the catalyst precious metal (irreversible deterioration of the upstream side exhaust purification catalyst 20, below, also referred to as "permanent deterioration") is high, and the upstream side exhaust purification catalyst 20 has become abnormal. In addition, in the present embodiment, when the air-fuel ratio of the exhaust gas flowing into the upstream side exhaust purification catalyst 20 is a rich air-fuel ratio and the air-fuel ratio of the exhaust gas flowing out from the upstream side exhaust purification catalyst 20 is the stoichiometric air-fuel ratio, abnormality in the upstream side exhaust purification catalyst 20 is diagnosed, while when the air-fuel ratio of the exhaust gas flowing into the upstream side exhaust purification catalyst 20 is a lean air-fuel ratio, abnormality in the upstream side exhaust purification catalyst 20 is not diagnosed. In other words, in the present embodiment, it can be said that the degree of permanent deterioration is estimated not based on the output of the $NO_X$ sensor 46 when the air-fuel ratio of the exhaust gas flowing into the upstream side exhaust purification catalyst 20 is a lean air-fuel ratio but based on the output of the $NO_X$ sensor 46 when the air-fuel ratio of the exhaust gas flowing into the upstream side exhaust purification catalyst 20 is a rich air-fuel ratio, and thereby abnormality in the upstream side exhaust purification catalyst 20 is diagnosed.

Figure 7:
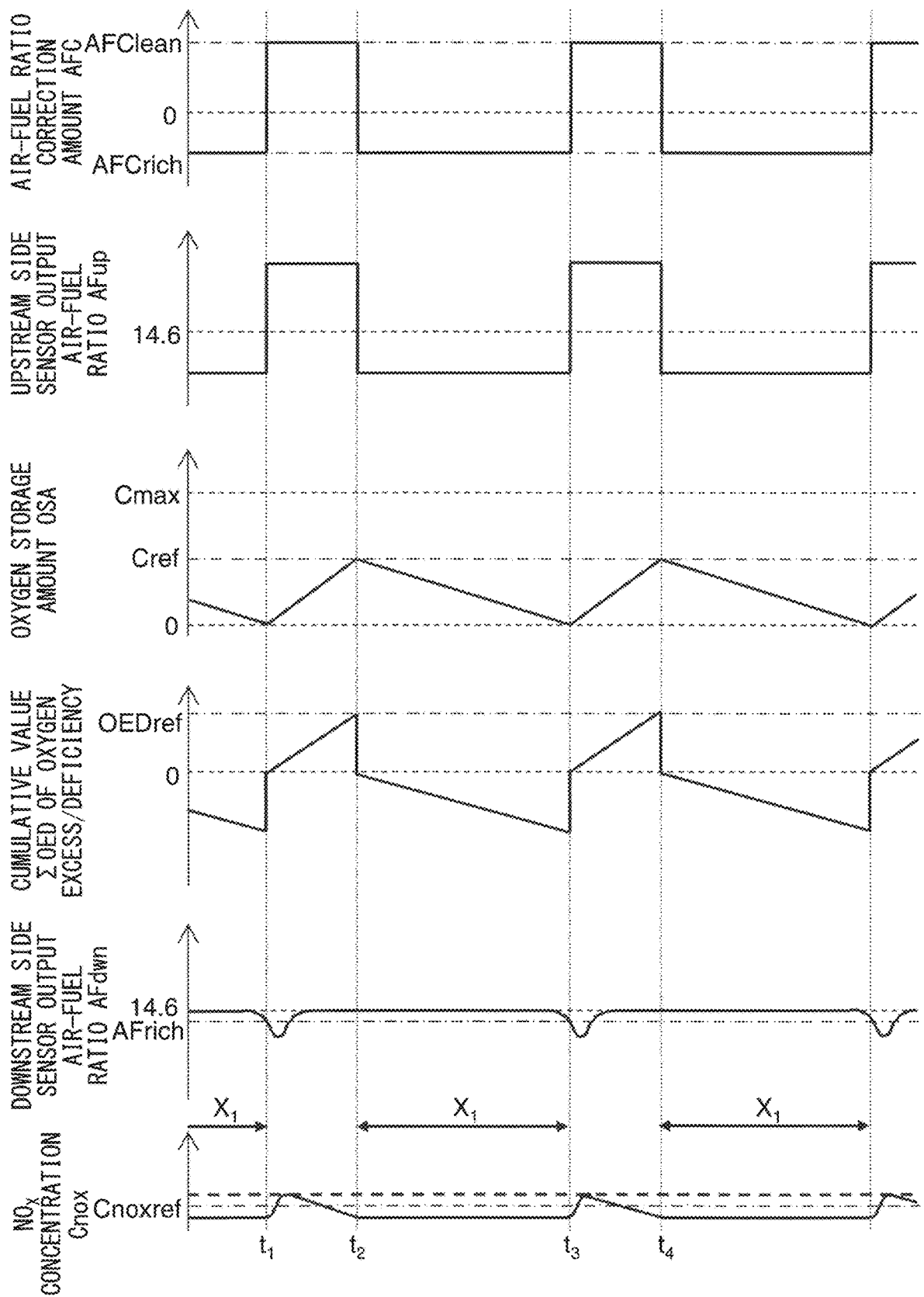
FIG. 7 is a time chart, similar to FIG. 3, showing changes in the oxygen storage amount of the upstream side exhaust purification catalyst, etc., when diagnosing abnormality in the upstream side exhaust purification catalyst.

FIG. 7 is a time chart, similar to FIG. 3, showing the changes in the oxygen storage amount of the upstream side exhaust purification catalyst 20, etc., when diagnosing abnormality in the upstream side exhaust purification catalyst 20. In particular, regarding the $NO_X$ concentration detected by the $NO_X$ sensor 46, the solid line in the figure shows the case where the upstream side exhaust purification catalyst 20 is normal, while the broken line in the figure shows the case where the upstream side exhaust purification catalyst 20 is abnormal. In addition, FIG. 7 shows the $NO_X$ concentration, etc., in the case where the intake air amount is relatively small. As shown in FIG. 7, even when diagnosing abnormality in the upstream side exhaust purification catalyst 20, air-fuel ratio control similar to FIG. 3 is performed.

As shown in FIG. 7 by the broken line, if the upstream side exhaust purification catalyst 20 is abnormal (in the figure, broken line), both when the target air-fuel ratio is a rich air-fuel ratio (when the air-fuel ratio correction amount AFC is a negative value) and when the target air-fuel ratio is a lean air-fuel ratio (when the air-fuel ratio correction amount AFC is a positive value), the $NO_X$ concentration detected by the $NO_X$ sensor 46 is greater than the judgement reference value Cnoxref.

On the other hand, as shown in FIG. 7 by the solid line, if the upstream side exhaust purification catalyst 20 is normal, when the target air-fuel ratio is a rich air-fuel ratio (when the air-fuel ratio correction amount AFC is a negative value), the $NO_X$ concentration detected by the $NO_X$ sensor 46 is a low value of less than the judgement reference value Cnoxref. As opposed to this, when, due to the effect of the above-mentioned HC poisoning, the target air-fuel ratio is a lean air-fuel ratio (when the air-fuel ratio correction amount AFC is a positive value), the $NO_X$ concentration detected by the $NO_X$ sensor 46 is a high value equal to or greater than the judgement reference value Cnoxref.

Further, as explained above, in the present embodiment, abnormality in the upstream side exhaust purification catalyst 20 is diagnosed when the air-fuel ratio of the exhaust gas flowing into the upstream side exhaust purification catalyst 20 is a rich air-fuel ratio, that is, only during the time period shown by $X_1$ in the figure. As will be understood from FIG. 7, in the time period $X_1$ in the figure, if the upstream side exhaust purification catalyst 20 is abnormal, the $NO_X$ concentration detected by the $NO_X$ sensor 46 is the judgement reference value Cnoxref or more. On the other hand, in this time period $X_1$, if the upstream side exhaust purification catalyst 20 is normal, the $NO_X$ concentration detected by the $NO_X$ sensor 46 is less than the judgement reference value Cnoxref. Therefore, by diagnosing abnormality in the upstream side exhaust purification catalyst 20 based on whether the $NO_X$ concentration detected by the $NO_X$ sensor 46 is the judgement reference value Cnoxref or more in this time period $X_1$, it is possible to accurately judge abnormality of the upstream side exhaust purification catalyst 20.

Note that, in the above embodiment, regardless of the intake air amount, when the target air-fuel ratio is the lean air-fuel ratio, abnormality in the upstream side exhaust purification catalyst 20 is not diagnosed. However, as will be understood from FIGS. 5 and 6, even when the target air-fuel ratio is the lean air-fuel ratio, when the intake air amount is large, it is possible to accurately diagnose abnormality in the upstream side exhaust purification catalyst 20 based on the $NO_X$ concentration detected by the $NO_X$ sensor 46. Therefore, even if the target air-fuel ratio is the lean air-fuel ratio, it is also possible to diagnose abnormality in the upstream side exhaust purification catalyst 20 if the intake air amount to a combustion chamber 5 of the internal combustion engine is equal to or greater than a predetermined amount of air (for example, 15 g/sec).

<<Explanation of Flow Chart>>

Figure 8:
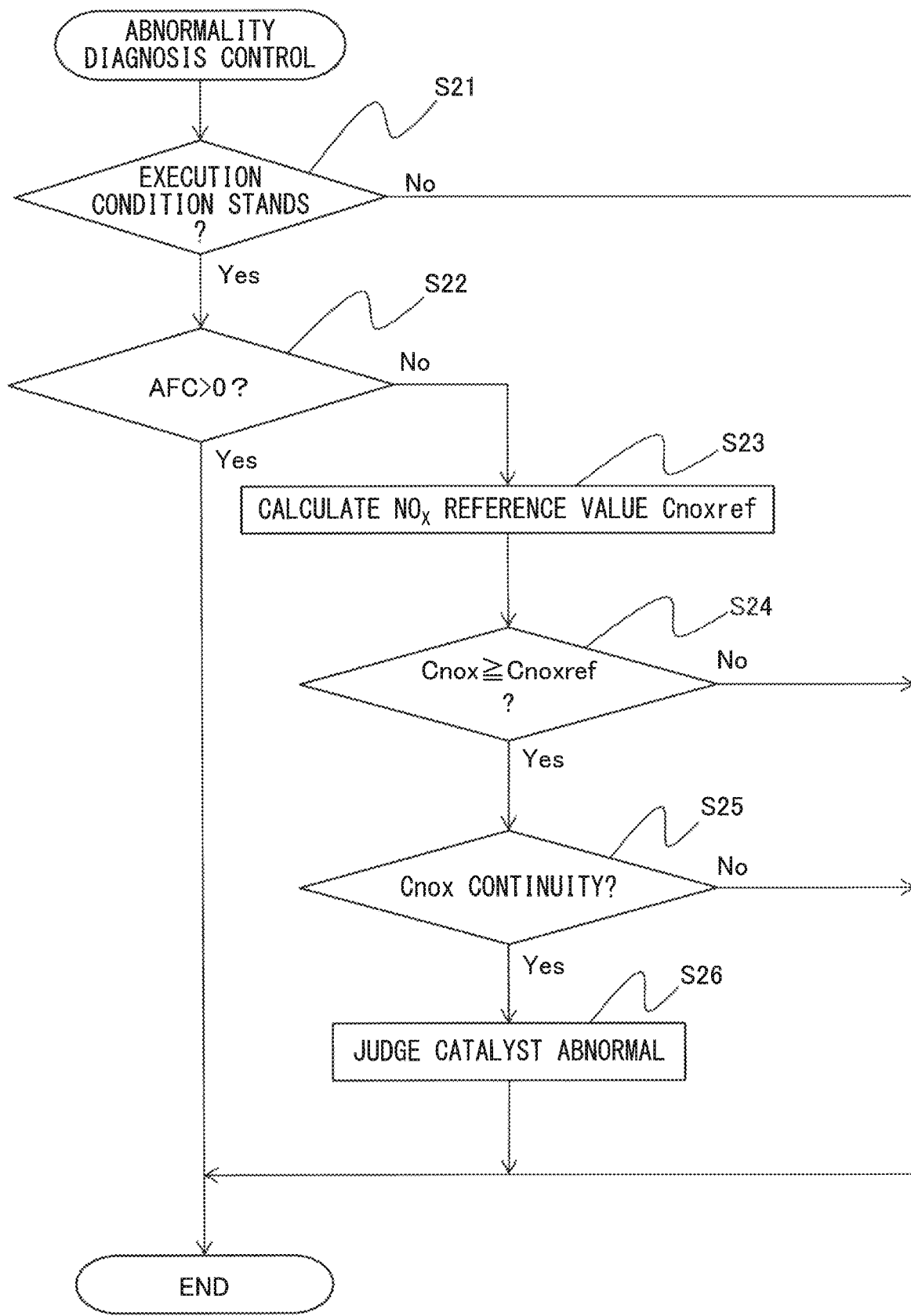
FIG. 8 is a flow chart showing a control routine of abnormality diagnosis control for diagnosing abnormality in the upstream side exhaust purification catalyst.

FIG. 8 is a flow chart showing a control routine of abnormality diagnosis control for diagnosing abnormality in the upstream side exhaust purification catalyst 20. The illustrated control routine is performed every constant time interval.

As shown in FIG. 8, first, at step S21, it is judged if the condition for execution of abnormality diagnosis stands. The condition for execution of abnormality diagnosis stands, for example, when the temperature of the upstream side exhaust purification catalyst 20 is the activation temperature or more and the temperatures of the air-fuel ratio sensors 40 and 41 and $NO_X$ sensor 46 are the activation temperature or more. The temperature of the upstream side exhaust purification catalyst 20 is, for example, detected by a temperature sensor (not shown) for detecting the temperature of the upstream side exhaust purification catalyst 20 or estimated based on the output of a temperature sensor (not shown) for detecting the temperature of the engine cooling water. If at step S21 it is judged that the condition for execution of abnormality diagnosis does not stand, the control routine is ended.

On the other hand, if at step S21 it is judged that the condition for execution of abnormality diagnosis stands, the routine proceeds to step S22. At step S22, it is judged if the air-fuel ratio correction amount AFC is a positive value, that is, if the target air-fuel ratio is a lean air-fuel ratio. If at step S22 it is judged that the air-fuel ratio correction amount AFC is a positive value, that is, if it is judged that the target air-fuel ratio is a lean air-fuel ratio, abnormality in the upstream side exhaust purification catalyst 20 is not diagnosed, and therefore the control routine is ended. On the other hand, if at step S22 it is judged that the air-fuel ratio correction amount AFC is a negative value, that is, if it is judged that the target air-fuel ratio is a rich air-fuel ratio, the routine proceeds to step S23.

At step S23, the judgement reference value Cnoxref is calculated based on the temperature of the upstream side exhaust purification catalyst 20, and intake air amount, etc. The judgement reference value Cnoxref is set, for example, to become greater as the temperature of the upstream side exhaust purification catalyst 20 becomes lower or as the intake air amount becomes greater. Note that, the judgement reference value Cnoxref may be a predetermined constant value. In this case, step S23 is omitted.

Next, at step S24, it is judged if the $NO_X$ concentration Cnox detected by the $NO_X$ sensor 46 is equal to or greater than the judgement reference value Cnoxref calculated at step S23. If at step S24 it is judged that the detected $NO_X$ concentration Cnox is less than the judgement reference value Cnoxref, the upstream-side exhaust purification catalyst 20 has not become abnormal and accordingly the control routine is ended.

On the other hand, if at step S24 it is judged that the detected $NO_X$ concentration Cnox is the judgement reference value Cnoxref or more, the routine proceeds to step S25. At step S25, referring to past information on the control routine, it is judged if the state where the detected $NO_X$ concentration Cnox is the judgement reference value Cnoxref or more has continued consecutively. This is a step for preventing noise of the $NO_X$ sensor 46, etc., from causing the detected $NO_X$ concentration Cnox to temporarily become the judgement reference value Cnoxref or more and thus causing the upstream side exhaust purification catalyst 20 to be mistakenly judged as being abnormal. Specifically, for example, when it is judged that in a plurality of times of control routine, the $NO_X$ concentration Cnox detected at step S24 continues to be the judgement reference value Cnoxref or more, it is judged that the state where the detected $NO_X$ concentration Cnox is the judgement reference value Cnoxref or more has continued consecutively.

If at step S25 it is judged that the state where the detected $NO_X$ concentration Cnox is the judgement reference value Cnoxref or more has not continued consecutively, the control routine is ended. On the other hand, if at step S25 it is judged that the state where the detected $NO_X$ concentration Cnox is the judgement reference value Cnoxref or more has continued consecutively, the routine proceeds to step S26. At step S26, it is judged that the upstream side exhaust purification catalyst 20 has become abnormal and, for example, a warning light is turned on.

Second Embodiment

Next, referring to FIGS. 9 and 10, an exhaust purification system according to a second embodiment will be explained. The configuration and control in the exhaust purification system according to the second embodiment are basically the same as the configuration and control of the exhaust purification system according to the first embodiment. Therefore, the parts different from the exhaust purification system according to the first embodiment will be mainly explained below.

Figure 9:
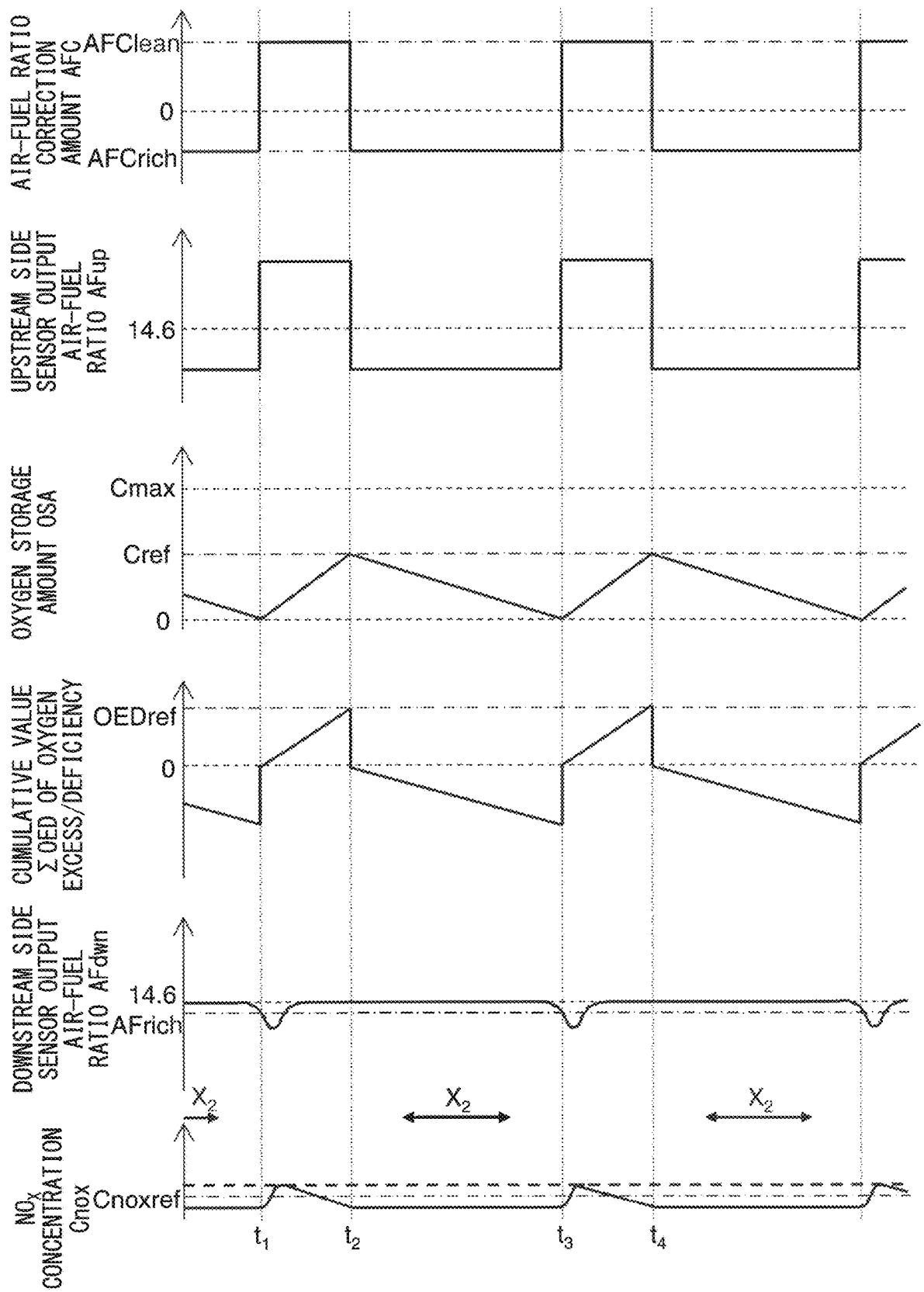
FIG. 9 is a time chart, similar to FIG. 7, showing changes in the oxygen storage amount of the upstream side exhaust purification catalyst, etc., when diagnosing abnormality in the upstream side exhaust purification catalyst.

FIG. 9 is a time chart, similar to FIG. 7, showing changes in the oxygen storage amount of the upstream side exhaust purification catalyst 20, etc., when diagnosing abnormality in the upstream side exhaust purification catalyst 20. In FIG. 9, similarly to FIG. 7, regarding the $NO_X$ concentration detected by the $NO_X$ sensor 46, the solid line in the figure shows the case where the upstream side exhaust purification catalyst 20 is normal, while the broken line in the figure shows the case where the upstream side exhaust purification catalyst 20 is abnormal.

In this regard, near the time of switching the target air-fuel ratio from the rich air-fuel ratio to the lean air-fuel ratio (for example, time $t_1$) or near the time of switching the target air-fuel ratio from the lean air-fuel ratio to the rich air-fuel ratio (for example, time $t_2$), the atmosphere in the upstream side exhaust purification catalyst 20 greatly changes. For this reason, along with the change in the atmosphere in the upstream side exhaust purification catalyst 20, despite the upstream side exhaust purification catalyst 20 being normal, there is a possibility of $NO_X$ flowing out from the upstream side exhaust purification catalyst 20.

Therefore, in the exhaust purification system according to the second embodiment, abnormality in the upstream side exhaust purification catalyst 20 is diagnosed only in time period (time period $X_2$ in figure) away from when the target air-fuel ratio is switched from the lean air-fuel ratio to the rich air-fuel ratio (for example, time $t_2$) and when the target air-fuel ratio is switched from the rich air-fuel ratio to the lean air-fuel ratio (for example, time $t_3$), within the time period where the target air-fuel ratio is set to a rich air-fuel ratio (for example, times $t_2$ to $t_3$). That is, in the present embodiment, the system diagnoses abnormality in the upstream side exhaust purification catalyst 20 only in a partial time period at the center of the time period when the target air-fuel ratio is set to the rich air-fuel ratio (for example, in the time period of half of the total time period).

Specifically, the time period corresponding to above time period $X_2$ is set based on the elapsed time from when the target air-fuel ratio is switched from the lean air-fuel ratio to the rich air-fuel ratio (for example, time $t_2$). Abnormality diagnosis of the upstream side exhaust purification catalyst 20 is started if the elapsed time from when switching the target air-fuel ratio becomes a first predetermined time or more, while diagnosis of abnormality is ended before it reaches a second predetermined time. In this regard, the first predetermined time is, for example, set to ⅛ to ⅓ or so of the time usually required from when switching the target air-fuel ratio to the rich air-fuel ratio to when switching it to the lean air-fuel ratio. Further, the second predetermined time is, for example, set to ⅔ to ⅞ or so of the time normally required from when switching the target air-fuel ratio to the rich air-fuel ratio to when switching it to the lean air-fuel ratio. Due to this, it is possible to keep the upstream side exhaust purification catalyst 20 from being mistakenly judged as being abnormal due to $NO_X$ flowing out from the upstream side exhaust purification catalyst 20 along with switching of the target air-fuel ratio.

Note that, in the above-mentioned example, the time period corresponding to the time period $X_2$ is set based on the elapsed time from when switching the target air-fuel ratio to a rich air-fuel ratio, but, for example, may also be set based on the cumulative oxygen deficiency, etc. In this case, the abnormality diagnosis of the upstream side exhaust purification catalyst 20 is started if the cumulative oxygen deficiency from when switching the target air-fuel ratio becomes a first predetermined amount or less, while the abnormality diagnosis is ended before it reaches a second predetermined amount. In this regard, the first predetermined amount is, for example, set to ⅛ to ⅓ or so of the oxygen storage capacity of the upstream side exhaust purification catalyst 20. Further, the second predetermined amount is, for example, set to ⅔ to ⅞ or so of the oxygen storage capacity of the upstream side exhaust purification catalyst 20.

Figure 10:
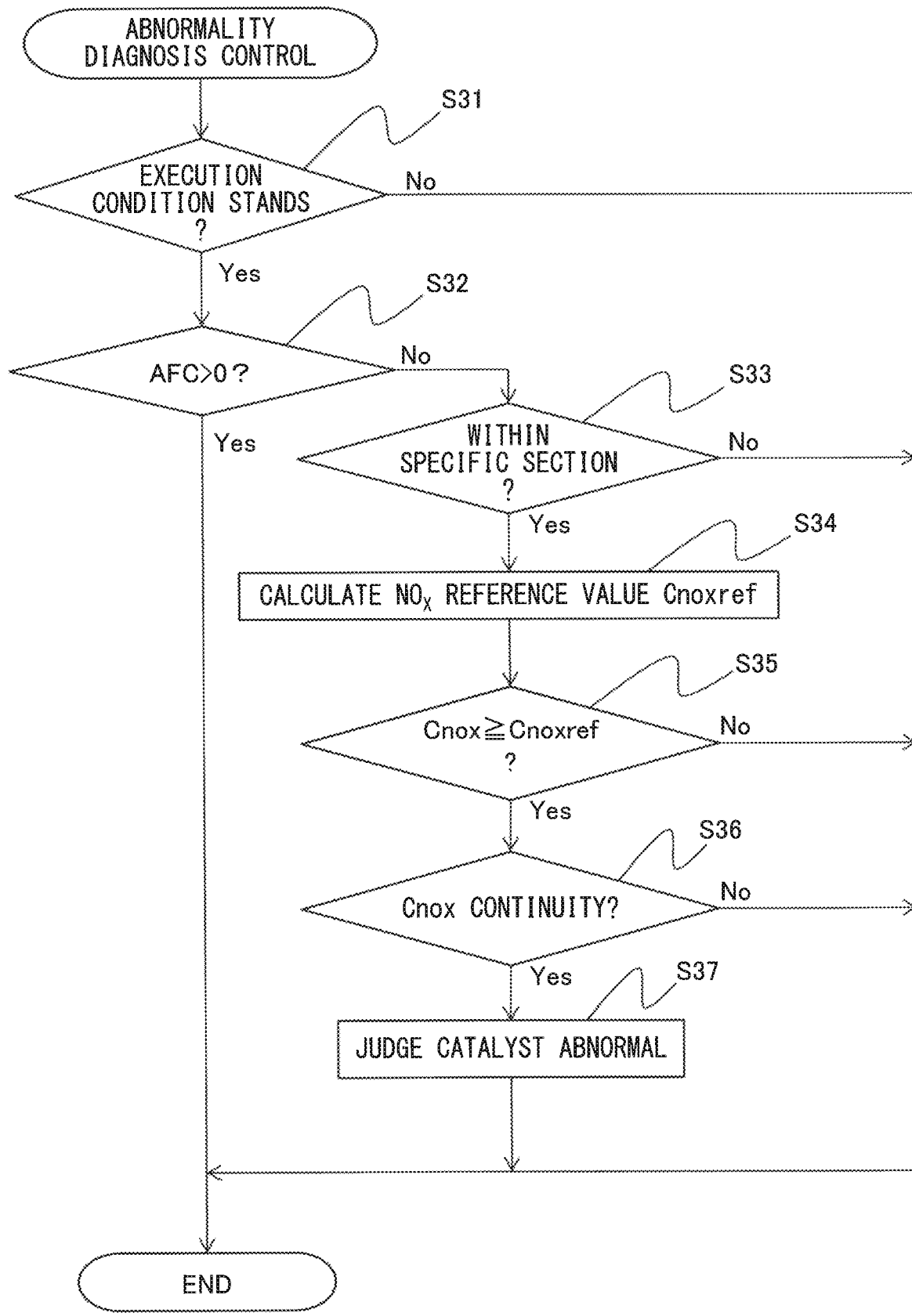
FIG. 10 is a flow chart showing a control routine of abnormality diagnosis control for diagnosing abnormality in the upstream side exhaust purification catalyst according to the present embodiment.

FIG. 10 is a flow chart of a control routine of abnormality diagnosis control for diagnosing abnormality in the upstream side exhaust purification catalyst 20 according to the present embodiment. The illustrated control routine is performed every constant time interval. Steps S31 and S32 of FIG. 10 are similar to steps S21 and S22 of FIG. 8, further, steps S34 to S37 of FIG. 10 are similar to steps S23 to S26 of FIG. 8, and therefore explanations of these will be omitted.

When at step S32 it is judged that the air-fuel ratio correction amount AFC is a negative value, that is, when it is judged that the target air-fuel ratio is a rich air-fuel ratio, the routine proceeds to step S33. At step S33, it is judged if the current time is within a specific time period corresponding to the above-mentioned time period $X_2$. Whether or not the current time is within a specific time period, is judged based on the time from when switching the target air-fuel ratio to the rich air-fuel ratio or the cumulative oxygen excess/deficiency ΣOED. If at step S33 it is judged that the current time is not within the above specific time period, the control routine is ended. On the other hand, if at step S33 it is judged that the current time is within the above specific time period, the routine proceeds to step S34.

Third Embodiment

Next, referring to FIG. 11, an exhaust purification system according to a third embodiment will be explained. The configuration and control in the exhaust purification system according to the third embodiment are basically the same as the configuration and control of the exhaust purification systems according to the first embodiment and second embodiment. Therefore, the parts different from the exhaust purification systems according to the first embodiment and second embodiment will be mainly explained below.

In the above first embodiment and second embodiment, in air-fuel ratio control, if the output air-fuel ratio AFdwn of the downstream side air-fuel ratio sensor 41 becomes the rich judged air-fuel ratio AFrich or less, the target air-fuel ratio is switched from a rich air-fuel ratio to a lean air-fuel ratio. In addition, if the cumulative oxygen excess/deficiency ΣOED becomes the switching reference value OEDref or more, the target air-fuel ratio is switched from a lean air-fuel ratio to a rich air-fuel ratio.

In the present embodiment, the target air-fuel ratio is switched from a rich air-fuel ratio to a lean air-fuel ratio at a similar timing, that is, when the output air-fuel ratio AFdwn of the downstream side air-fuel ratio sensor 41 becomes the rich judged air-fuel ratio AFrich or less. On the other hand, the target air-fuel ratio is switched from a lean air-fuel ratio to a rich air-fuel ratio when the output air-fuel ratio AFdwn of the downstream side air-fuel ratio sensor 41 becomes the lean judged air-fuel ratio AFlean or more.

Even in the case of such air-fuel ratio control, when setting the target air-fuel ratio at a lean air-fuel ratio, there is a possibility of the upstream side exhaust purification catalyst 20 being poisoned by HC. Therefore, in the present embodiment as well, abnormality in the upstream side exhaust purification catalyst 20 is diagnosed in the time period when the target air-fuel ratio has been set to a rich air-fuel ratio (time period $X_1$ in FIG. 11) or a specific time period of part of this time period (corresponding to specific time period of the above second embodiment).

Fourth Embodiment

Next, referring to FIGS. 12 to 15, an exhaust purification system according to a fourth embodiment will be explained. The configuration and control in the exhaust purification system according to the fourth embodiment are basically the same as the configuration and control of the exhaust purification systems according to the first embodiment to the third embodiment. Therefore, the parts different from the exhaust purification systems according to these embodiments will be mainly explained below.

<<Types of Catalyst Deterioration>>

In this regard, the deterioration of the upstream side exhaust purification catalyst 20 includes, in addition to the deterioration due to the sintering of the catalyst precious metals such as explained above, S poisoning deterioration arising due to the sulfur component in the exhaust gas being stored in the upstream side exhaust purification catalyst 20.

With deterioration due to sintering of the catalyst precious metals, once sintering causes the catalyst precious metals to aggregate, it is not possible to restore the aggregated catalyst precious metals to their original states, in the state where the upstream side exhaust purification catalyst 20 is carried in a vehicle. Therefore, deterioration due to sintering of the catalyst precious metals can be said to be irreversible deterioration (as explained above, such deterioration will be called "permanent deterioration").

On the other hand, with S poisoning deterioration, even if the upstream side exhaust purification catalyst 20 stores the sulfur component, it is possible to cause desorption of the sulfur component stored, under specific conditions (for example, the temperature of the upstream side exhaust purification catalyst 20 is a certain high temperature or more and the air-fuel ratio of the exhaust gas flowing into the upstream side exhaust purification catalyst 20 is a rich air-fuel ratio). Therefore, S poisoning deterioration can be said to be reversible deterioration.

Note that, below, the deterioration of the upstream side exhaust purification catalyst 20 including these permanent deterioration and S poisoning deterioration will be called the "total deterioration". Therefore, if the degree of deterioration due to permanent deterioration of the upstream side exhaust purification catalyst 20 rises, the degree of total deterioration of the upstream side exhaust purification catalyst 20 rises, while similarly if the degree of deterioration due to S poisoning deterioration of the upstream side exhaust purification catalyst 20 rises, the degree of total deterioration of the upstream side exhaust purification catalyst 20 rises.

<<Deterioration Estimated by Deterioration Estimation>>

As explained above, when setting the target air-fuel ratio of the exhaust gas flowing into the upstream side exhaust purification catalyst 20 at the rich air-fuel ratio and the oxygen storage amount OSA of the upstream side exhaust purification catalyst 20 has not been near zero (that is, when due to the oxygen storage ability of the upstream side exhaust purification catalyst 20, the air-fuel ratio of the exhaust gas flowing out from the upstream side exhaust purification catalyst 20 is near the stoichiometric air-fuel ratio), as the concentration of $NO_X$ flowing out from the upstream side exhaust purification catalyst 20 is higher, it can be judged that the deterioration of the upstream side exhaust purification catalyst 20 is greater. Further, if not considering the HC poisoning, even when setting the target air-fuel ratio of the exhaust gas flowing into the upstream side exhaust purification catalyst 20 at a lean air-fuel ratio and the oxygen storage amount OSA of the upstream side exhaust purification catalyst 20 is not near the maximum oxygen storage capacity Cmax (that is, when, due to the oxygen storage ability of the upstream side exhaust purification catalyst 20, the air-fuel ratio of the exhaust gas flowing out from the upstream side exhaust purification catalyst 20 is near the stoichiometric air-fuel ratio), as the concentration of $NO_X$ flowing out from the upstream side exhaust purification catalyst 20 is higher, it can be judged that the deterioration of the upstream side exhaust purification catalyst 20 is greater. That is, the degree of deterioration of the upstream side exhaust purification catalyst 20 can be estimated based on the concentration of $NO_X$ flowing out from the upstream side exhaust purification catalyst 20.

The degree of deterioration of the upstream side exhaust purification catalyst 20 estimated at this time is considered to be the degree of deterioration due to permanent deterioration. That is, the degree of deterioration of the upstream side exhaust purification catalyst 20 estimated at this time is believed to be the degree of deterioration of the upstream side exhaust purification catalyst 20 from which the effect due to S poisoning deterioration has been excluded from the total deterioration. Below, the reason why it is considered as above will be explained.

Figure 12:
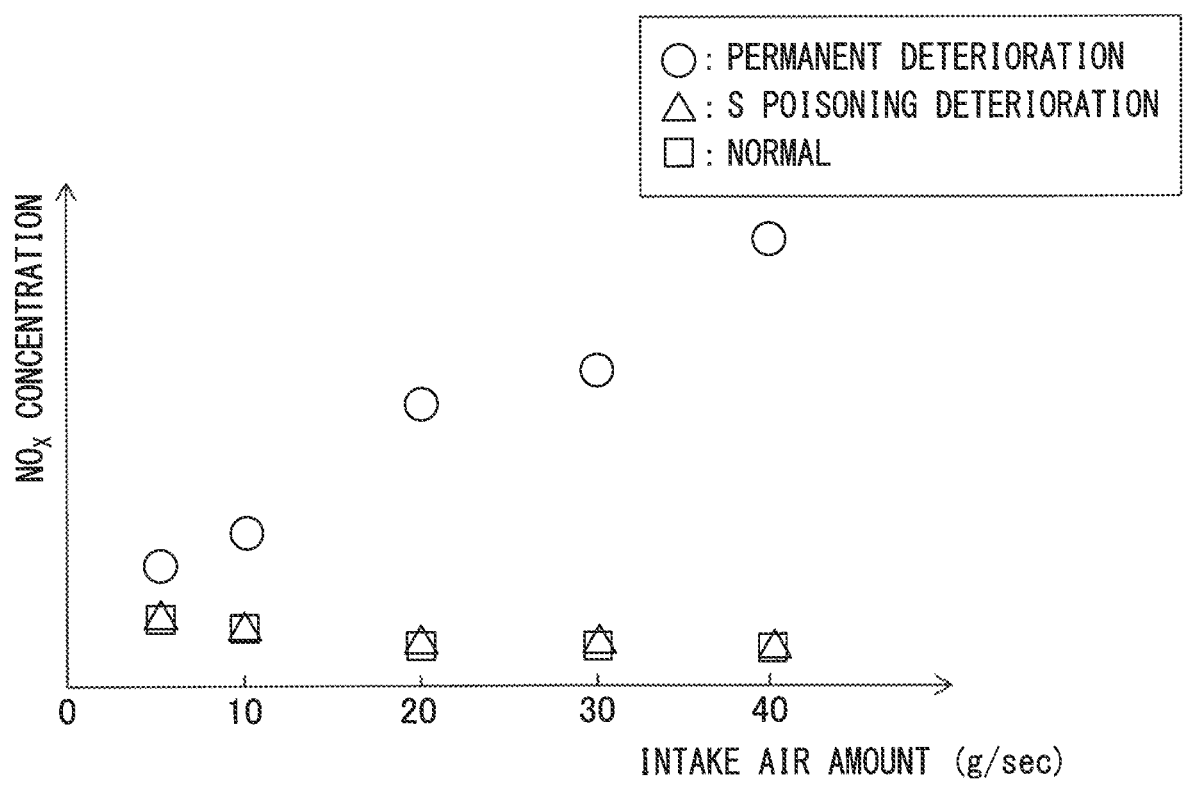
FIG. 12 is a view, similar to FIG. 5, showing a relationship between an intake air amount and $NO_X$ concentration detected by an $NO_X$ sensor, in the case where the target air-fuel ratio is the rich air-fuel ratio.

FIG. 12 is a view, similar to FIG. 5, showing the relationship between the intake air amount and the $NO_X$ concentration detected by the $NO_X$ sensor 46 in the case where the target air-fuel ratio is a rich air-fuel ratio. The square marks in FIG. 12 show the relationship in the case where the upstream side exhaust purification catalyst 20 is normal. On the other hand, the circle marks in FIG. 12 show the relationship in the case where the exhaust purification catalyst 20 is not suffering from S poisoning deterioration, but is suffering from permanent deterioration, while the triangle marks show the relationship in the case where the upstream side exhaust purification catalyst 20 is not suffering from permanent deterioration, but is suffering from S poisoning deterioration.

As will be understood from FIG. 12, if the upstream side exhaust purification catalyst 20 suffers from permanent deterioration, the $NO_X$ concentration detected by the $NO_X$ sensor 46 will be higher, compared with the case where the upstream side exhaust purification catalyst 20 is normal. This is because, as explained above, if the upstream side exhaust purification catalyst 20 suffers from permanent deterioration, the amount of $NO_X$ flowing out from the upstream side exhaust purification catalyst 20 increases. On the other hand, if the upstream side exhaust purification catalyst 20 is suffering from S poisoning deterioration, the $NO_X$ concentration detected by the $NO_X$ sensor 46 is the same extent as the case where the upstream side exhaust purification catalyst 20 is normal. From these results, it is believed that the degree of deterioration of the upstream side exhaust purification catalyst 20 estimated based on the concentration of $NO_X$ flowing out from the upstream side exhaust purification catalyst 20, is the degree of deterioration due to permanent deterioration.

The mechanism behind the phenomenon that the concentration of $NO_X$ flowing out from the upstream side exhaust purification catalyst 20 will change according to the degree of deterioration due to permanent deterioration and will not change according to the S poisoning deterioration in this way, has not been elucidated. However, it is believed that such a phenomenon occurs due to the following mechanism.

Figure 13A:
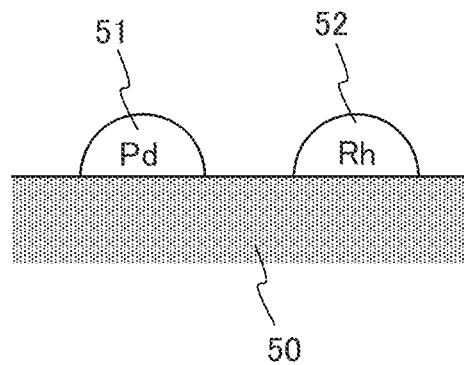
FIGS. 13A and 13B are cross-sectional views schematically showing the vicinity of the surface of an exhaust purification catalyst.
Figure 13B:
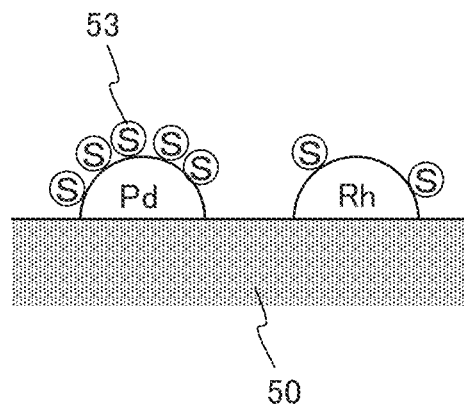

FIGS. 13A and 13B are cross-sectional views schematically showing the vicinity of the surface of the exhaust purification catalyst. As shown in FIG. 13A, at the surface of the exhaust purification catalyst, palladium 51 and rhodium 52 are carried as catalyst precious metals on the carrier 50 carrying a substance having an oxygen storage ability. If permanent deterioration occurs at the thus configured exhaust purification catalyst, the particles of the palladium 51 and the particles of the rhodium 52 carried on the carrier 50 will aggregate due to sintering. As a result, the surface areas of the palladium 51 and rhodium 52 will become smaller and thus the catalytic actions due to these catalyst precious metals will fall.

FIG. 13B shows a cross-sectional view of the time when S poisoning deterioration occurs. As shown in FIG. 13B, the sulfur component 53 tends to be adsorbed at the surface of the palladium 51 and to be hard to be adsorbed at the surface of the rhodium 52. Therefore, if S poisoning deterioration occurs at the exhaust purification catalyst, the catalytic action due to the palladium 51 will fall, but the catalytic action due to the rhodium 52 will not fall that much. In this regard, reduction of the $NO_X$ in the exhaust gas is promoted mainly by the rhodium 52. For this reason, even if S poisoning deterioration occurs in the exhaust purification catalyst, the reduction of the $NO_X$ by the rhodium 52 is not restricted that much. Due to such a mechanism, as shown in FIG. 12, even if S poisoning deterioration occurs, it is believed that the concentration of $NO_X$ flowing out from the upstream side exhaust purification catalyst 20 will not change according to the S poisoning deterioration.

<<Control in Fourth Embodiment>>

In consideration of such a phenomenon, it is possible to estimate the degree of deterioration due to permanent deterioration of the upstream side exhaust purification catalyst 20 based on the concentration of $NO_X$ flowing out from the upstream side exhaust purification catalyst 20. However, if the air-fuel ratio of the exhaust gas flowing into the upstream side exhaust purification catalyst 20 is the lean air-fuel ratio, as explained above, due to HC poisoning, sometimes it is not possible to accurately estimate the degree of deterioration of the upstream side exhaust purification catalyst 20 from the $NO_X$ concentration. Therefore, in the present embodiment, the degree of deterioration due to permanent deterioration of the upstream side exhaust purification catalyst 20 is estimated not based on the output of the $NO_X$ sensor 46 when the air-fuel ratio of the exhaust gas flowing into the upstream side exhaust purification catalyst 20 is a lean air-fuel ratio, but based on the output of the $NO_X$ sensor 46 when the air-fuel ratio of the exhaust gas flowing into the upstream side exhaust purification catalyst 20 is a rich air-fuel ratio.

Figure 14:
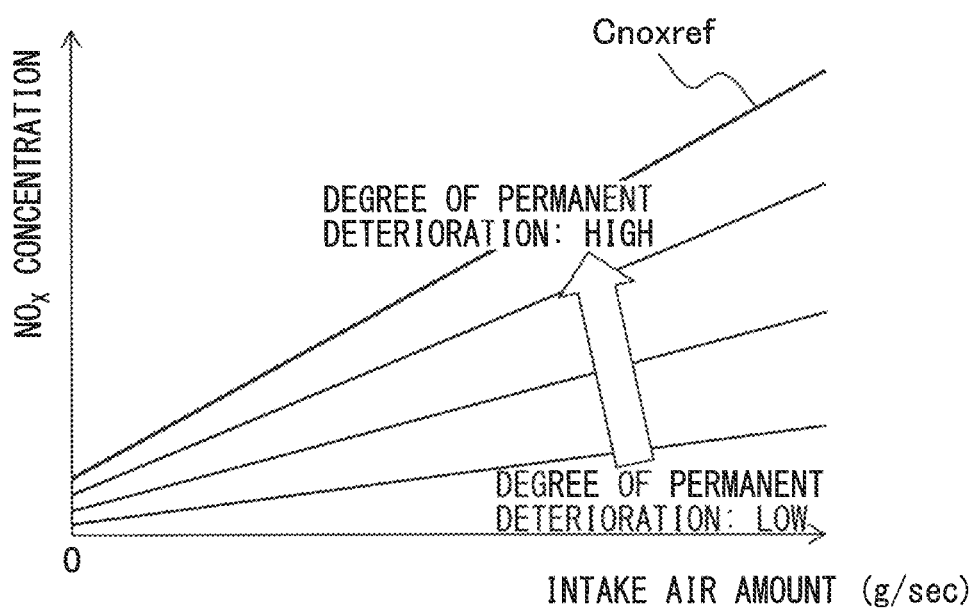
FIG. 14 is a view showing a relationship between an intake air amount and $NO_X$ concentration detected by the $NO_X$ sensor, and a degree of deterioration due to permanent deterioration of the upstream side exhaust purification catalyst.

FIG. 14 is a view showing the relationship between the intake air amount and the $NO_X$ concentration detected by the $NO_X$ sensor 46, and the degree of deterioration due to permanent deterioration of the upstream side exhaust purification catalyst 20. In the present embodiment, this relationship is used to estimate the degree of deterioration due to permanent deterioration of the upstream side exhaust purification catalyst 20 based on the intake air amount and $NO_X$ concentration. As shown in FIG. 14, the degree of deterioration due to permanent deterioration is estimated, assuming that as the $NO_X$ concentration detected by the $NO_X$ sensor 46 is higher when the air-fuel ratio of the exhaust gas flowing into the upstream side exhaust purification catalyst 20 is a rich air-fuel ratio, the degree of deterioration due to permanent deterioration of the upstream side exhaust purification catalyst 20 is higher. Further, as shown in FIG. 14, the degree of deterioration due to permanent deterioration is estimated, assuming that as the intake air amount to a combustion chamber 5 is smaller, the degree of deterioration due to permanent deterioration of the upstream side exhaust purification catalyst 20 is higher.

In addition, as shown in FIG. 14, when the $NO_X$ concentration detected by the $NO_X$ sensor 46 is the judgement reference value Cnoxref or more, the degree of deterioration due to permanent deterioration is extremely high, and therefore it is judged that the upstream side exhaust purification catalyst 20 is abnormal. The judgement reference value Cnoxref at this time is, for example, set in the same way as the judgement reference value Cnoxref in the first embodiment. Therefore, the judgement reference value Cnoxref is set so as to be larger as the intake air amount is greater.

Figure 15:
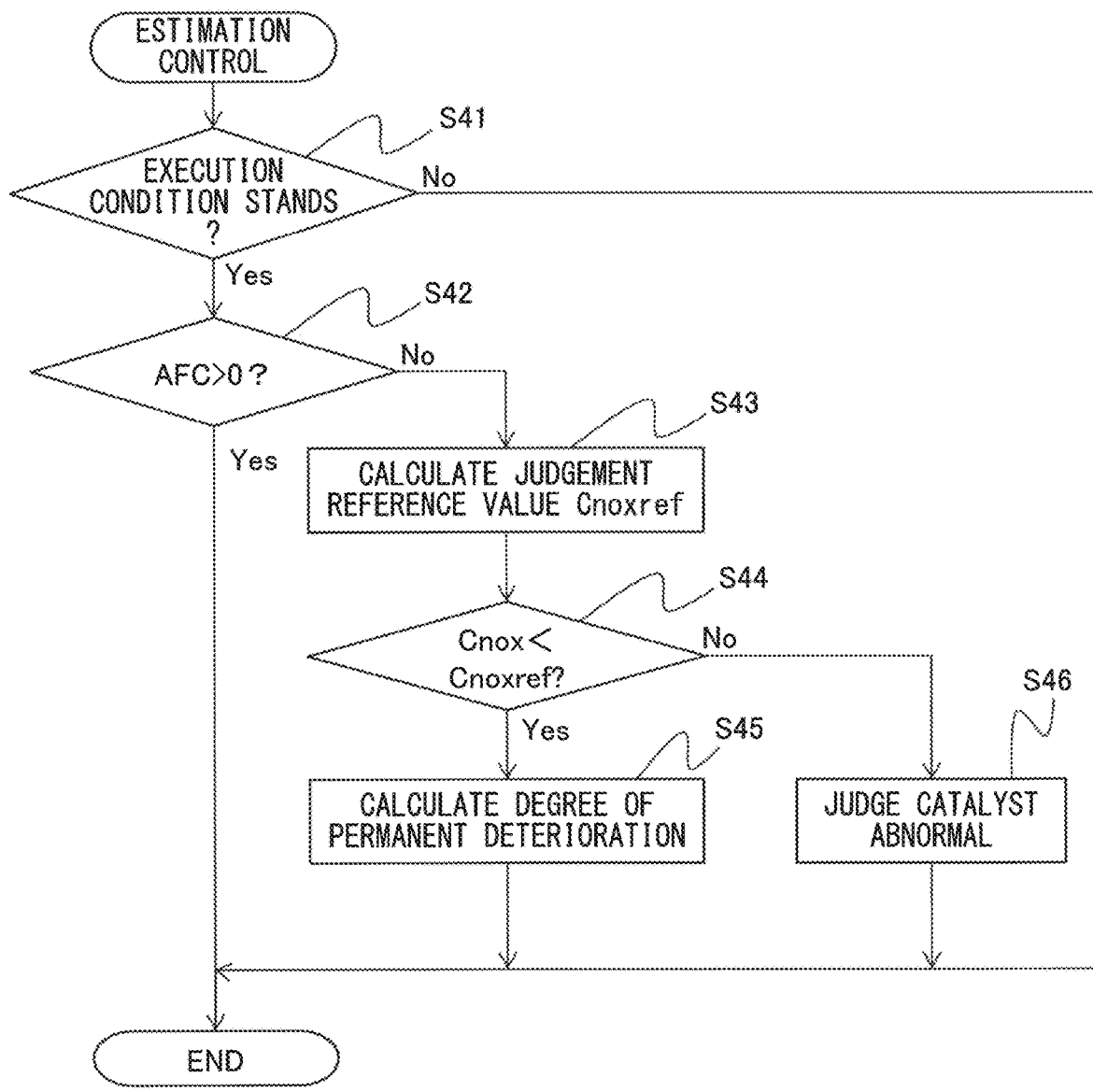
FIG. 15 is a flow chart showing a control routine of control for estimation of a degree of deterioration which estimates the degree of deterioration due to permanent deterioration of the upstream side exhaust purification catalyst.

FIG. 15 is a flow chart showing a control routine of deterioration degree estimation control for estimating the degree of deterioration due to permanent deterioration of the upstream side exhaust purification catalyst 20. The illustrated control routine is performed every constant time interval.

As shown in FIG. 15, first, at step S41, it is judged if the condition for execution of deterioration degree estimation control stands. The condition for execution of deterioration degree estimation control is, for example, similar to the condition for execution of abnormality diagnosis at step S21 of FIG. 8. If at step S41 it is judged that the condition for execution of abnormality diagnosis stands, the routine proceeds to step S42.

At step S42, it is judged whether the air-fuel ratio correction amount AFC is a positive value, that is, if the exhaust gas flowing into the upstream side exhaust purification catalyst 20 is a lean air-fuel ratio. If at step S42 it is judged that the air-fuel ratio correction amount AFC is a positive value, the degree of deterioration is not estimated and the control routine is ended. On the other hand, if at step S42 it is judged that the air-fuel ratio correction amount AFC is a negative value, the routine proceeds to step S43.

At step S43, for example, the intake air amount to a combustion chamber 5 is calculated based on the output of the air flow meter 39, while the judgement reference value Cnoxref is calculated based on the calculated intake air amount. The judgement reference value Cnoxref, as explained above, is calculated to be larger as the intake air amount is greater.

Next, at step S44, it is judged if the $NO_X$ concentration detected by the $NO_X$ sensor 46 Cnox is equal to or greater than the judgement reference value Cnoxref calculated at step S43. Note that, the $NO_X$ concentration Cnox used at step S43 may also be the average value of the $NO_X$ concentration detected by the $NO_X$ sensor 46, etc., in a predetermined time period. If at step S43 it is judged that the detected $NO_X$ concentration Cnox is less than the judgement reference value Cnoxref, the routine proceeds to step S45.

At step S45, the degree of deterioration due to permanent deterioration of the upstream side exhaust purification catalyst 20 is calculated, based on the intake air amount calculated at step S43 and the $NO_X$ concentration Cnox detected by the $NO_X$ sensor 46, by using the map shown in FIG. 14, and then the control routine is ended.

On the other hand, if at step S44 it is judged that the detected $NO_X$ concentration Cnox is the judgement reference value Cnoxref or more, the routine proceeds to step S46. At step S46, it is judged that the upstream side exhaust purification catalyst 20 is abnormal and, for example, a warning light is turned on.

Fifth Embodiment

Next, referring to FIGS. 16 to 19, an exhaust purification system according to the fifth embodiment will be explained. The configuration and control in the exhaust purification system according to the fifth embodiment are basically the same as the configuration and control of the exhaust purification systems according to the third and the fourth embodiments. Therefore, the parts different from the exhaust purification systems according to these embodiments will be explained below.

<<Method for Estimating S Poisoning Deterioration>>

In this regard, as explained above, deterioration of the upstream side exhaust purification catalyst 20 can be roughly divided to permanent deterioration and S poisoning deterioration. Among these, regarding permanent deterioration, the degree of deterioration can be estimated by the technique according to the fourth embodiment. However, with the technique according to the fourth embodiment, the degree of deterioration due to S poisoning deterioration cannot be estimated. Therefore, in the present embodiment, a technique for estimating the degree of deterioration due to S poisoning deterioration is provided.

Figure 11:
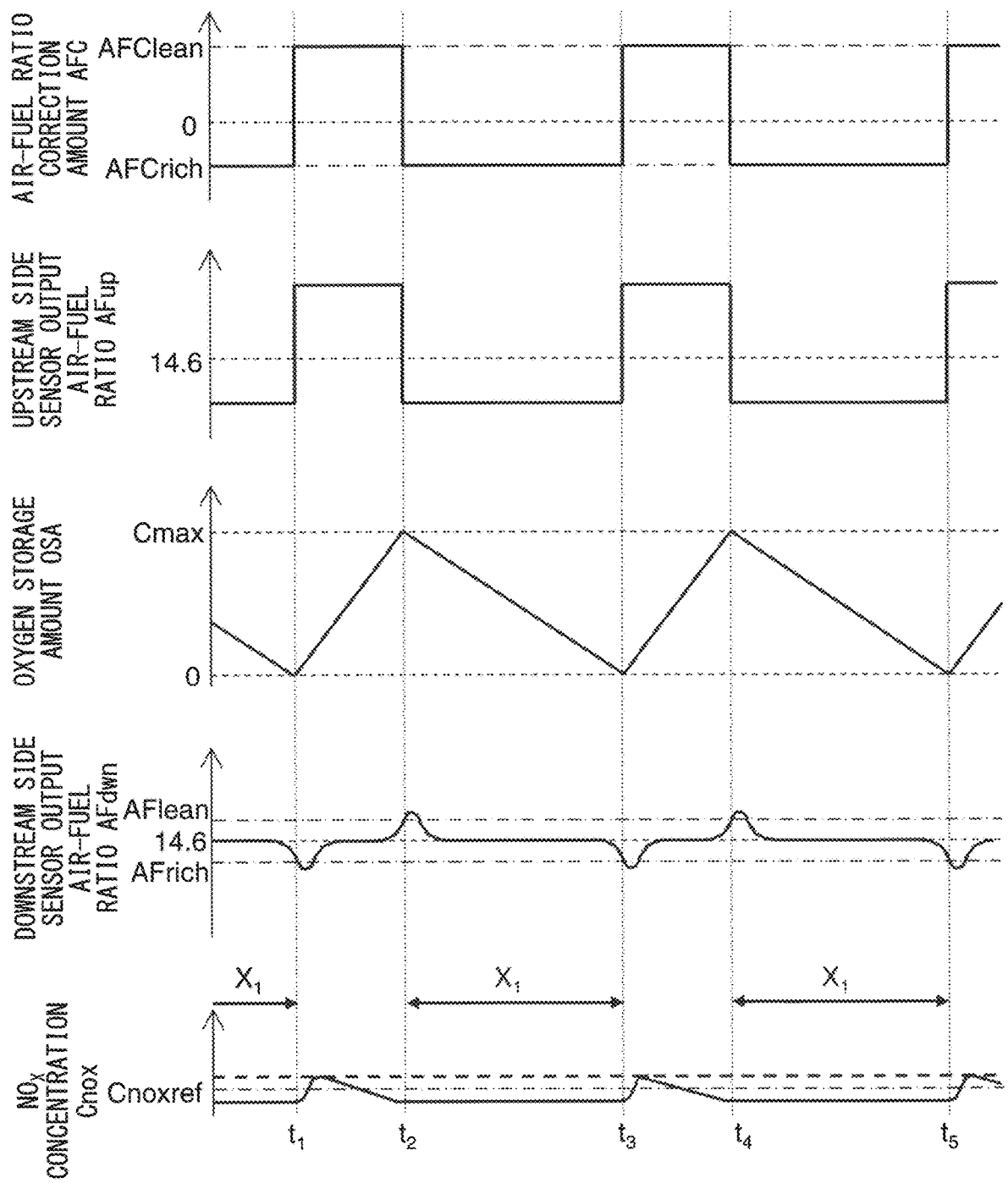
FIG. 11 is a time chart, similar to FIG. 7, showing changes in the oxygen storage amount of the upstream side exhaust purification catalyst, etc., when diagnosing abnormality in the upstream side exhaust purification catalyst.
Figure 16:
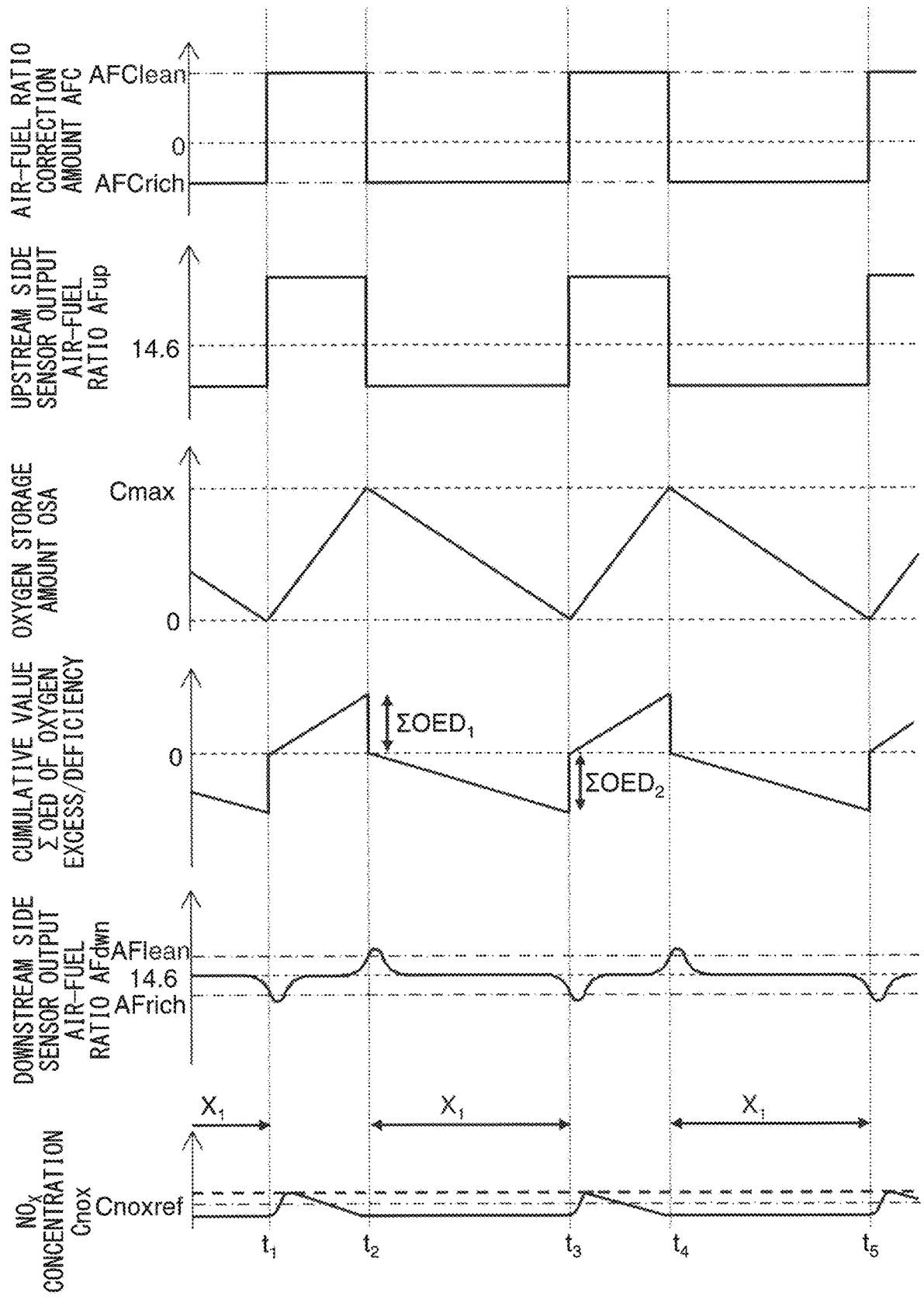
FIG. 16 is a time chart of the air-fuel ratio correction amount, etc., in the case of performing air-fuel ratio control similar to the third embodiment shown in FIG. 11.

FIG. 16 is a time chart of the air-fuel ratio correction amount, etc., when performing air-fuel ratio control similar to the third embodiment shown in FIG. 11. As shown in FIG. 16, in the present embodiment, when the output air-fuel ratio AFdwn of the downstream side air-fuel ratio sensor 41 becomes the rich judged air-fuel ratio AFrich or less, the air-fuel ratio correction amount AFC is switched from the rich set correction amount AFCrich to the lean set correction amount AFClean. Therefore, at this time, the target air-fuel ratio is switched from a rich air-fuel ratio to a lean air-fuel ratio and accordingly the air-fuel ratio of the exhaust gas flowing into the upstream side exhaust purification catalyst 20 changes from a rich air-fuel ratio to a lean air-fuel ratio. On the other hand, in the present embodiment, when the output air-fuel ratio AFdwn of the downstream side air-fuel ratio sensor 41 becomes the lean judged air-fuel ratio AFlean or more, the air-fuel ratio correction amount AFC is switched from the lean set correction amount AFClena to the rich set correction amount AFCrich. Therefore, at this time, the target air-fuel ratio is switched from a lean air-fuel ratio to a rich air-fuel ratio and accordingly the air-fuel ratio of the exhaust gas flowing into the upstream side exhaust purification catalyst 20 changes from a lean air-fuel ratio to a rich air-fuel ratio.

In this regard, the amount of oxygen stored in the upstream side exhaust purification catalyst 20, from when the air-fuel ratio of the exhaust gas flowing into the upstream side exhaust purification catalyst 20 changes to a lean air-fuel ratio in the state where the output air-fuel ratio AFdwn of the downstream side air-fuel ratio sensor 41 is the rich judged air-fuel ratio AFrich or less, to when the output air-fuel ratio AFdwn of the downstream side air-fuel ratio sensor 41 becomes the lean judged air-fuel ratio AFlean or more, expresses the amount of oxygen which the upstream side exhaust purification catalyst 20 can store. That is, in FIG. 16, for example, the cumulative oxygen excess/deficiency $\Sigma OED$ from the time $t_1$ to the time $t_2$ (in the figure, $\Sigma OED_1$) expresses the amount of oxygen which the upstream side exhaust purification catalyst 20 can store.

Similarly, the amount of oxygen released from the upstream side exhaust purification catalyst 20, from when the air-fuel ratio of the exhaust gas flowing into the upstream side exhaust purification catalyst 20 changes to a rich air-fuel ratio in the state where the output air-fuel ratio AFdwn of the downstream side air-fuel ratio sensor 41 is the lean judged air-fuel ratio AFlean or more, to when the output air-fuel ratio AFdwn of the downstream side air-fuel ratio sensor 41 falls to the rich judged air-fuel ratio AFrich or less, also expresses the amount of oxygen which the upstream side exhaust purification catalyst 20 can store. That is, in FIG. 16, for example, the cumulative oxygen excess/deficiency $\Sigma OED$ from the time $t_2$ to the time $t_3$ (in the figure, $\Sigma OED_2$) also expresses the amount of oxygen which the upstream side exhaust purification catalyst 20 can store.

Further, it is known that the oxygen storage capacity of the exhaust purification catalyst changes according to the degree of total deterioration of the exhaust purification catalyst. In particular, the higher the degree of total deterioration of the exhaust purification catalyst, including the above-mentioned permanent deterioration and S poisoning deterioration, the more the oxygen storage capacity of the exhaust purification catalyst decreases. Therefore, as explained above, the oxygen storage capacity of the upstream side exhaust purification catalyst 20 calculated based on the cumulative oxygen excess/deficiency $\Sigma OED$ decreases, as the degree of total deterioration of the upstream side exhaust purification catalyst 20 is higher. Therefore, as explained above, if possible to calculate the oxygen storage capacity of the upstream side exhaust purification catalyst 20, it is possible to estimate the degree of total deterioration of the upstream side exhaust purification catalyst 20 based on the calculated oxygen storage capacity of the upstream side exhaust purification catalyst 20.

Further, in addition to the degree of deterioration due to permanent deterioration of the upstream side exhaust purification catalyst 20, if possible to find the degree of total deterioration of the upstream side exhaust purification catalyst 20 in this way, it is possible to calculate the degree of deterioration due to S poisoning deterioration of the upstream side exhaust purification catalyst 20 based on these.

<<Control in Fifth Embodiment>>

Therefore, according to the present embodiment, first, the degree of total deterioration of the upstream side exhaust purification catalyst 20 is estimated in total deterioration degree estimation control. In the total deterioration degree estimation control in the present embodiment, the degree of total deterioration of the upstream side exhaust purification catalyst 20 is estimated, based on the oxygen storage capacity of the upstream side exhaust purification catalyst 20 or a parameter changing in accordance with the oxygen storage capacity (for example, cumulative oxygen excess/deficiency). The oxygen storage capacity of the upstream side exhaust purification catalyst 20 or the parameter changing according to it is calculated as, for example, the value of the amount of oxygen stored in the upstream side exhaust purification catalyst 20 (or the parameter changing in accordance with this amount of oxygen) from the state where the output air-fuel ratio AFdwn of the downstream side air-fuel ratio sensor 41 is the rich judged air-fuel ratio AFrich or less to the state where it becomes the lean judged air-fuel ratio AFlean or more, or the value of the amount of oxygen released from the upstream side exhaust purification catalyst 20 (or parameter changing in accordance with this amount of oxygen) from the state where the output air-fuel ratio AFdwn of the downstream side air-fuel ratio sensor 41 is the lean judged air-fuel ratio AFlean or more to the state where it becomes the rich judged air-fuel ratio AFrich or less.

Then, the degree of deterioration due to S poisoning deterioration of the upstream side exhaust purification catalyst 20 is calculated, based on the degree of deterioration due to permanent deterioration of the upstream side exhaust purification catalyst 20 estimated based on the output of the $NO_X$ sensor 46, and the degree of total deterioration of the upstream side exhaust purification catalyst 20 estimated based on the oxygen storage capacity of the upstream side exhaust purification catalyst 20.

Figure 17:
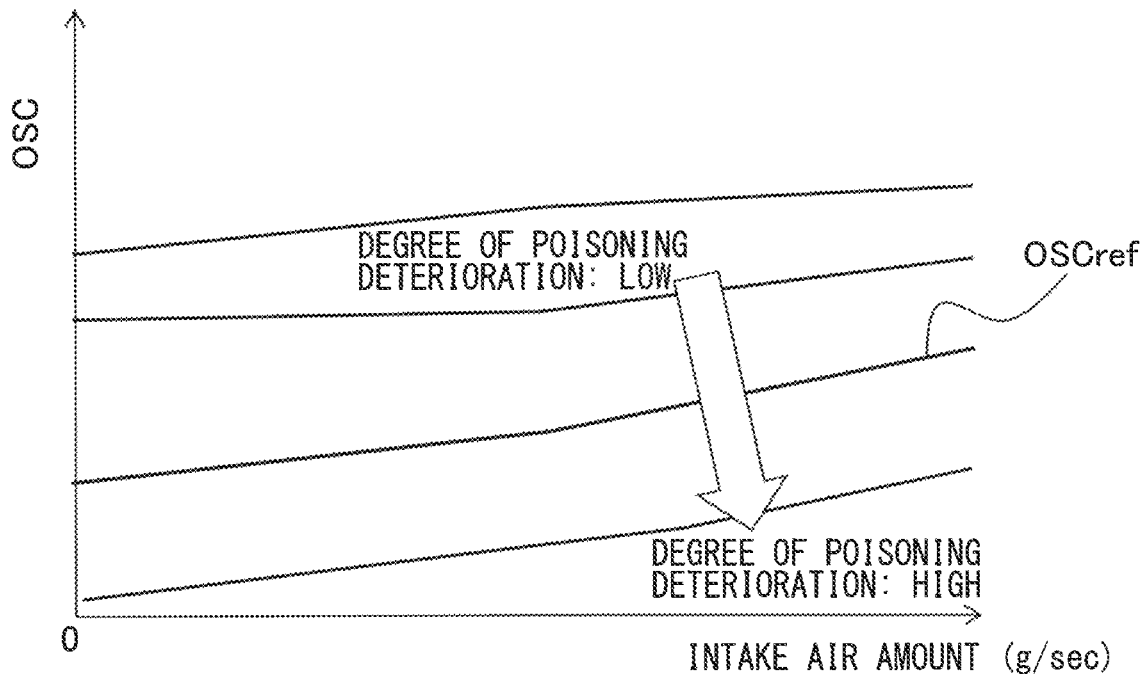
FIG. 17 is a view showing a relationship of an intake air amount and oxygen storage capacity, and a degree of deterioration due to S poisoning deterioration of the upstream side exhaust purification catalyst.
Figure 18:
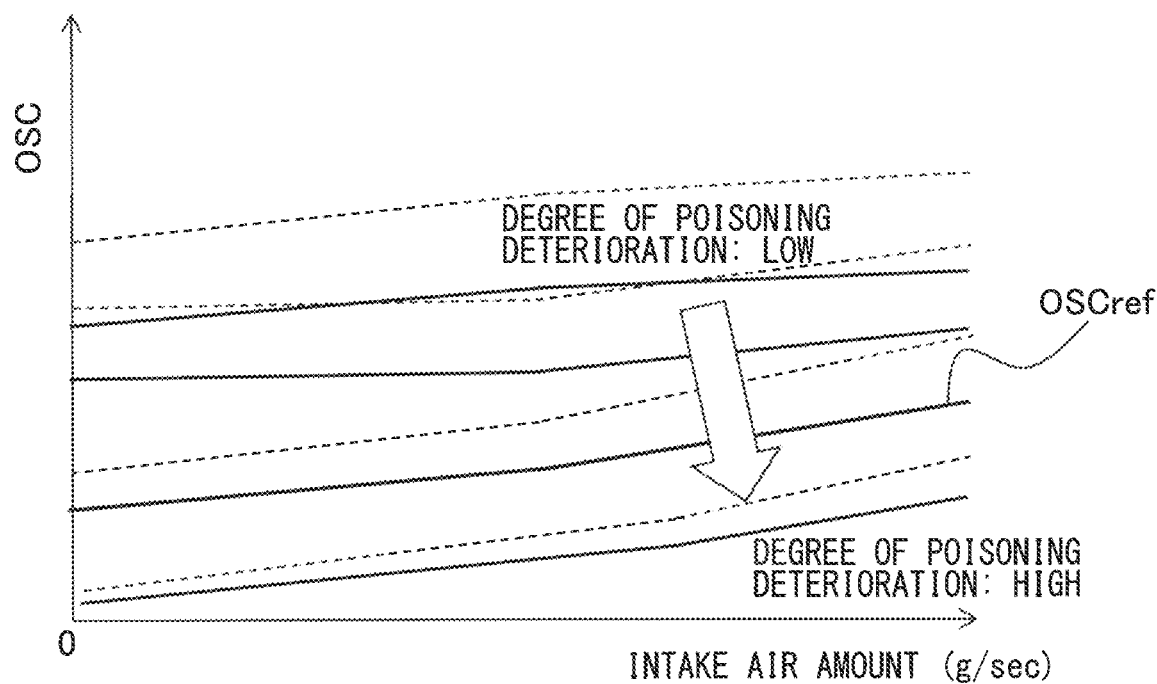
FIG. 18 is a view showing a relationship of an intake air amount and oxygen storage capacity, and a degree of deterioration due to S poisoning deterioration of the upstream side exhaust purification catalyst.

FIGS. 17 and 18 are views showing the relationships of the intake air amount and oxygen storage capacity OSC and the degree of deterioration due to S poisoning deterioration of the upstream side exhaust purification catalyst 20. In the present embodiment, the degree of deterioration due to S poisoning deterioration of the upstream side exhaust purification catalyst 20 is estimated based on intake air amount and oxygen storage capacity OSC, using these relationships. In particular, FIG. 17 shows the relationship in the case where the degree of deterioration due to permanent deterioration of the upstream side exhaust purification catalyst 20 is low, while FIG. 18 shows the relationship in the case where the degree of deterioration due to permanent deterioration of the upstream side exhaust purification catalyst 20 is high. Note that, the broken line in FIG. 18 shows the relationship when the degree of deterioration due to permanent deterioration of the upstream side exhaust purification catalyst 20 is low, that is, the relationship of FIG. 17.

As shown in FIGS. 17 and 18, the degree of deterioration due to S poisoning deterioration is estimated assuming the degree of deterioration due to S poisoning deterioration is lower as the oxygen storage capacity OSC is greater, that is, as the degree of total deterioration of the upstream side exhaust purification catalyst 20 is lower. Further, as shown in FIGS. 17 and 18, the degree of deterioration due to S poisoning deterioration is estimated assuming the degree of deterioration due to S poisoning deterioration of the upstream side exhaust purification catalyst 20 is higher as the intake air amount into a combustion chamber 5 is smaller.

Further, as will be understood from a comparison of the relationship shown in FIG. 17 and the relationship shown in FIG. 18, if the degree of deterioration due to permanent deterioration of the upstream side exhaust purification catalyst 20 is high (FIG. 18), compared to if it is low (FIG. 17), the degree of deterioration due to S poisoning deterioration is estimated lower with respect to the oxygen storage capacity OSC, that is, the degree of total deterioration of the upstream side exhaust purification catalyst 20. Therefore, if the degree of deterioration due to permanent deterioration is high (FIG. 18), compared to if it is low (FIG. 17), even if the oxygen storage capacity OSC is the same, that is, even if the degree of total deterioration of the upstream side exhaust purification catalyst 20 is the same, the degree of deterioration due to S poisoning deterioration is estimated low.

Further, in the present embodiment, if the degree of deterioration due to S poisoning deterioration becomes a certain amount or more, it is judged that the sulfur poisoning of the upstream side exhaust purification catalyst 20 has become great. Specifically, if the oxygen storage capacity OSC becomes the poisoning reference oxygen storage capacity OSCref or less, that is, if the degree of total deterioration of the upstream side exhaust purification catalyst 20 becomes the poisoning reference value or more, it is judged that the sulfur poisoning of the upstream side exhaust purification catalyst 20 has become large. The poisoning reference oxygen storage capacity OSCref, that is, the poisoning reference value, is set based on the degree of deterioration due to permanent deterioration of the upstream side exhaust purification catalyst 20. Specifically, the poisoning reference oxygen storage capacity OSCref is set so as to be smaller as the degree of deterioration due to permanent deterioration is larger. Therefore, the poisoning reference value is set to be larger as the degree of deterioration due to permanent deterioration is greater.

When it is judged that the sulfur poisoning of the upstream side exhaust purification catalyst 20 is large, sulfur component is desorbed from the upstream side exhaust purification catalyst 20 by sulfur desorption processing. Further, to keep the sulfur component from being further stored in the upstream side exhaust purification catalyst 20, storage suppression processing is performed. In sulfur desorption processing, for example, the air-fuel ratio of the exhaust gas flowing into the upstream side exhaust purification catalyst 20 is made a rich air-fuel ratio and the temperature of the upstream side exhaust purification catalyst 20 is made to rise so as to become the sulfur desorption temperature or more. Further, in the storage suppression processing, in performing the above-mentioned basic air-fuel ratio control, the rich degree of the rich set air-fuel ratio is small and the lean degree of the lean set air-fuel ratio is large. Due to this, the time during which the air-fuel ratio of the exhaust gas flowing into the upstream side exhaust purification catalyst 20 is a rich air-fuel ratio becomes relatively long. As a result, it becomes harder for the sulfur component to be stored in the upstream side exhaust purification catalyst 20.

According to the present embodiment, it is possible to estimate the degree of deterioration due to S poisoning deterioration, independently from the permanent deterioration and the total deterioration. Therefore, it is possible to perform sulfur desorption processing, etc., based on the degree of deterioration due to S poisoning deterioration, and therefore it is possible to perform sulfur desorption processing at a suitable timing. In this regard, the sulfur desorption processing gives rise to deterioration of the fuel efficiency since it is necessary to raise the temperature of the upstream side exhaust purification catalyst 20, etc., As opposed to this, according to the present embodiment, the sulfur desorption processing is performed at a suitable timing, and therefore deterioration of the fuel efficiency due to sulfur desorption processing being performed at an unnecessarily high frequency, can be suppressed. Further, it is possible to keep the frequency of sulfur desorption processing from being too low and thus to keep the purification ability of the upstream side exhaust purification catalyst 20 from falling.

Figure 19:
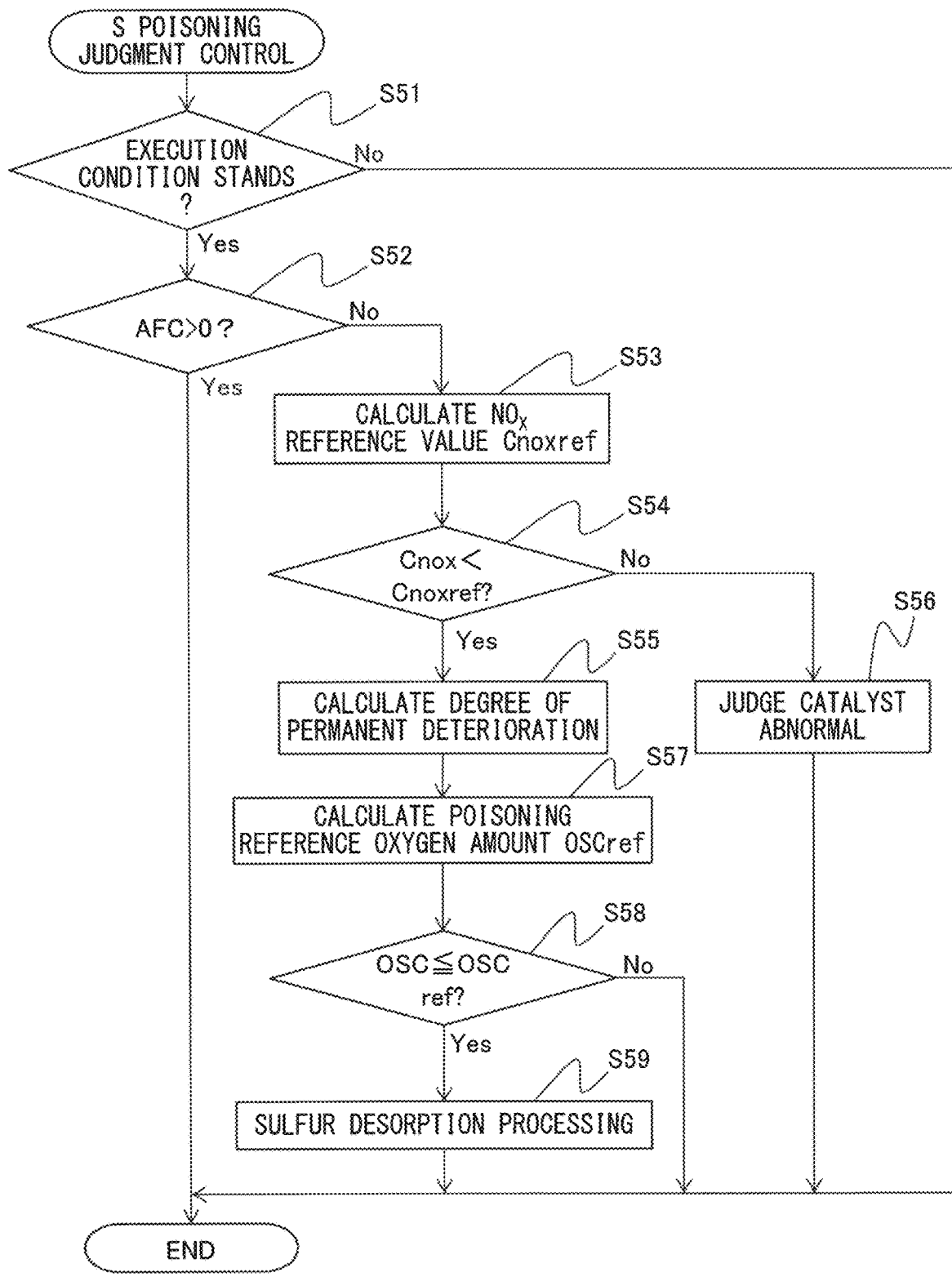
FIG. 19 is a flow chart showing a control routine of control for judgment of S poisoning, which judges a degree of deterioration due to S poisoning deterioration of the upstream side exhaust purification catalyst.

FIG. 19 is a flow chart of a control routine of S poisoning judgment control for judging the degree of deterioration due to S poisoning deterioration of the upstream side exhaust purification catalyst 20. The illustrated control routine is performed every constant time interval. Steps S51 to S56 shown in FIG. 19 are similar to steps S41 to S46 of FIG. 15, and therefore explanations will be omitted.

If at step S55 the degree of deterioration due to permanent deterioration of the upstream side exhaust purification catalyst 20 is calculated, at the next step S57, the poisoning reference oxygen storage capacity OSCref is calculated based on the intake air amount and degree of deterioration due to permanent deterioration by using a map such as shown in FIGS. 17 and 18. Note that, at this time, the degree of deterioration due to S poisoning deterioration may be calculated by using a map such as shown in FIGS. 17 and 18.

Next, at step S58, the oxygen storage capacity OSC is calculated based on the cumulative oxygen excess/deficiency ΣOED and it is judged if the calculated oxygen storage capacity OSC is equal to or smaller than the poisoning reference oxygen storage capacity OSCref calculated at step S57. If at step S58 it is judged that the oxygen storage capacity OSC is greater than the poisoning reference oxygen storage capacity OSCref, the control routine is ended. On the other hand, when at step S58 it is judged that the oxygen storage capacity OSC is the poisoning reference oxygen storage capacity OSCref or less, the routine proceeds to step S59. At step S59, sulfur desorption processing is performed to make the sulfur component be desorbed from the upstream side exhaust purification catalyst 20. Further, if the condition for execution of the sulfur desorption processing does not stand and thus sulfur desorption processing cannot immediately be performed, storage suppression processing is performed for suppressing the further storage of the sulfur component at the upstream side exhaust purification catalyst 20 until the condition for execution of sulfur desorption processing stands.

Sixth Embodiment

Next, referring to FIGS. 20 and 21, an exhaust purification system according to a sixth embodiment will be explained. The configuration and control in the exhaust purification system according to the sixth embodiment are basically the same as the configuration and control of the exhaust purification systems according to the fifth embodiment. Therefore, the parts different from the exhaust purification systems according to the fifth embodiment will be explained below.

In this regard, in the exhaust purification system according to the fifth embodiment, the degree of total deterioration of the upstream side exhaust purification catalyst 20 was estimated based on the oxygen storage capacity of the upstream side exhaust purification catalyst 20. However, the degree of total deterioration of the upstream side exhaust purification catalyst 20 may also be estimated by a different method. Therefore, in the exhaust purification system of the sixth embodiment the degree of total deterioration of the upstream side exhaust purification catalyst 20 is estimated by a method different from the exhaust purification system of the fifth embodiment.

Figure 20:
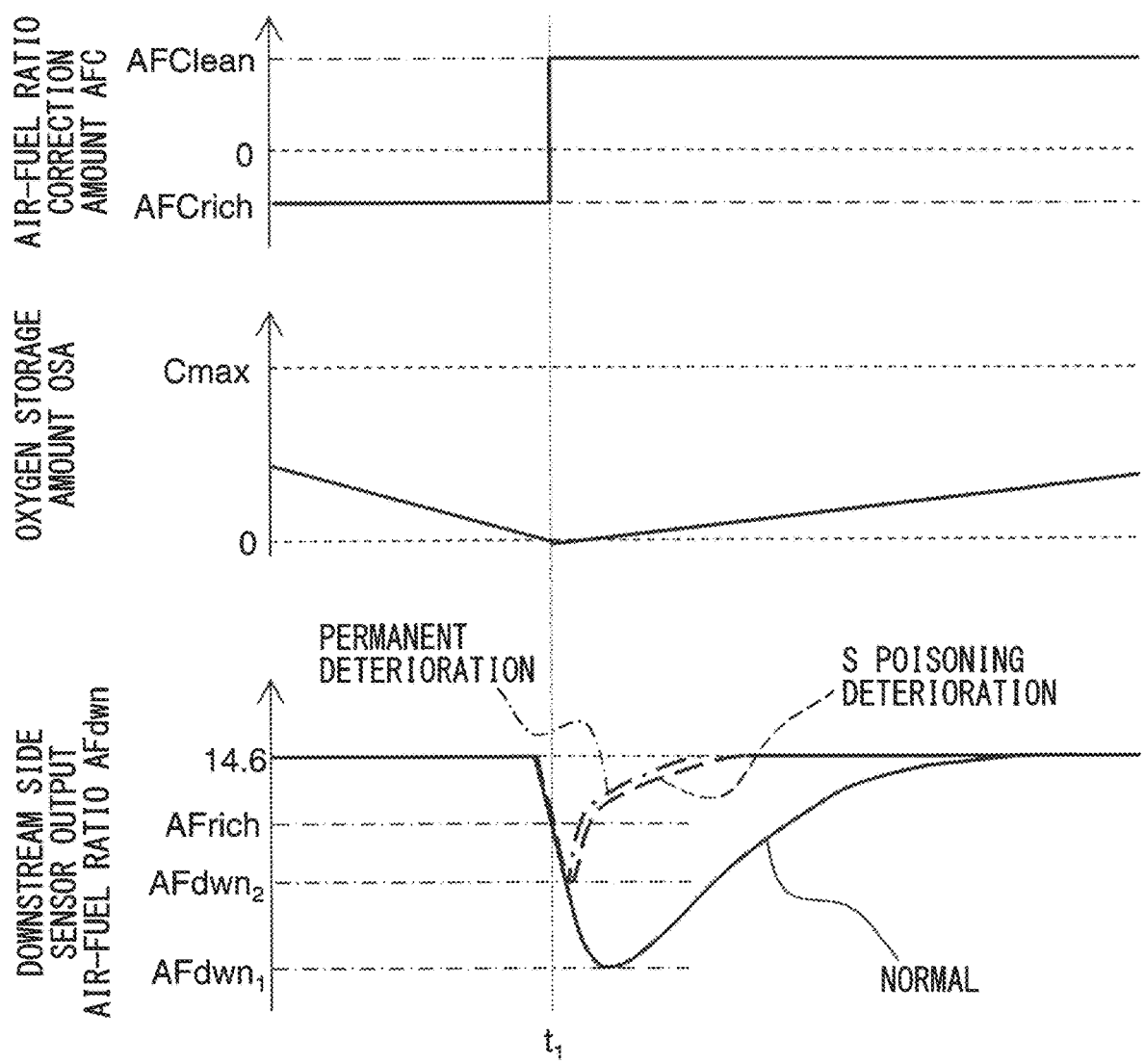
FIG. 20 is a time chart of the air-fuel ratio correction amount, etc., in the case of performing air-fuel ratio control.

FIG. 20 is a time chart of the air-fuel ratio correction amount, the oxygen storage amount OSA of the upstream side exhaust purification catalyst 20, and the output air-fuel ratio AFdwn of the downstream side air-fuel ratio sensor 41 in the case of performing the above-mentioned air-fuel ratio control. In the example shown in FIG. 20, before the time $t_1$, the air-fuel ratio correction amount AFC is set to the rich set correction amount AFCrich and thereby the air-fuel ratio of the exhaust gas flowing into the upstream side exhaust purification catalyst 20 is a rich air-fuel ratio. For this reason, the oxygen storage amount OSA of the upstream side exhaust purification catalyst 20 gradually decreases.

Then, if the oxygen storage amount OSA of the upstream side exhaust purification catalyst 20 becomes smaller, the output air-fuel ratio AFdwn of the downstream side air-fuel ratio sensor 41 becomes the rich judged air-fuel ratio AFrich or less, at the time $t_1$. If the output air-fuel ratio AFdwn of the downstream side air-fuel ratio sensor 41 becomes the rich judged air-fuel ratio AFrich or less, the air-fuel ratio correction amount AFC is switched from the rich set correction amount AFCrich to the lean set correction amount AFClean, and accordingly the air-fuel ratio of the exhaust gas flowing into the upstream side exhaust purification catalyst 20 is also switched from a rich air-fuel ratio to a lean air-fuel ratio.

However, the output air-fuel ratio AFdwn of the downstream side air-fuel ratio sensor 41 does not immediately rise even if the air-fuel ratio correction amount AFC is switched at the time $t_1$, and continues to fall even after the time $t_1$. This is because there is a distance from the engine body 1 to the upstream side exhaust purification catalyst 20, and therefore even if switching the air-fuel ratio correction amount AFC, the air-fuel ratio of the exhaust gas flowing into the upstream side exhaust purification catalyst 20 will not immediately change to the lean air-fuel ratio. Further, at this time, the behavior of the output air-fuel ratio AFdwn of the downstream side air-fuel ratio sensor 41 changes according to the state of the upstream side exhaust purification catalyst 20.

In FIG. 20, the solid line at the output air-fuel ratio AFdwn of the downstream side air-fuel ratio sensor 41 shows the case where the upstream side exhaust purification catalyst 20 is normal, the broken line shows the case where the upstream side exhaust purification catalyst 20 has deteriorated due to S poisoning, and the one-dot chain line shows the case where permanent deterioration has occurred.

As shown by the solid line in FIG. 20, if the upstream side exhaust purification catalyst 20 is normal, the minimum value which the output air-fuel ratio AFdwn reaches is low (AFdwn$_1$ in the figure). Further, the cumulative value of the difference of the output air-fuel ratio AFdwn from the stoichiometric air-fuel ratio (area of part surrounded by straight lines at output air-fuel ratio AFdwn and 14.6) is large. On the other hand, as shown in FIG. 20 by the broken line and one-dot chain line, if S poisoning deterioration or permanent deterioration occurs in the upstream side exhaust purification catalyst 20, the minimum value which the output air-fuel ratio AFdwn reaches, is relatively high (AFdwn$_2$ in the figure). Further, the cumulative value of the difference of the output air-fuel ratio AFdwn from the stoichiometric air-fuel ratio is also relatively small.

Such a phenomenon occurs due to the hydrogen in the exhaust gas. In a limit current type of air-fuel ratio sensor, the speed of diffusion of the hydrogen in the diffusion regulating layer of the air-fuel ratio sensor is fast, and therefore if the concentration of hydrogen in the exhaust gas is high, the output air-fuel ratio of the air-fuel ratio sensor will shift to the rich side from the actual air-fuel ratio of the exhaust gas.

On the other hand, in the upstream side exhaust purification catalyst 20, if exhaust gas of a rich air-fuel ratio flows in, hydrogen is produced due to the catalytic action of the upstream side exhaust purification catalyst 20. The amount of hydrogen produced at this time is greater as the activity of the previous metal catalyst of the upstream side exhaust purification catalyst 20 is higher. Therefore, when permanent deterioration or S poisoning deterioration does not occur in the upstream side exhaust purification catalyst 20, a large amount of hydrogen is produced. As a result, the output air-fuel ratio AFdwn of the downstream side air-fuel ratio sensor 41 greatly shifts to a rich side from the actual air-fuel ratio of the exhaust gas and accordingly, as shown by the solid line in FIG. 20, the minimum value becomes lower. On the other hand, when S poisoning deterioration or permanent deterioration occurs in the upstream side exhaust purification catalyst 20, only a small amount of hydrogen is produced. As a result, the output air-fuel ratio AFdwn of the downstream side air-fuel ratio sensor 41 shifts slightly to the rich side from the actual air-fuel ratio of the exhaust gas and accordingly, as shown by the broken line or one-dot chain line in FIG. 20, the minimum value will not become that low.

<<Control in Sixth Embodiment>>

Therefore, in the total deterioration degree estimation control in the present embodiment, after the air-fuel ratio correction amount AFC is switched from the rich set air-fuel ratio AFCrich to the lean set air-fuel ratio AFClean, that is, after the target air-fuel ratio is switched from a rich air-fuel ratio to a lean air-fuel ratio, in the convergence time period until the output air-fuel ratio AFdwn of the downstream side air-fuel ratio sensor 41 reaches the stoichiometric air-fuel ratio, the degree of total deterioration of the upstream side exhaust purification catalyst 20 is estimated based on the at least part of the behavior of the output air-fuel ratio AFdwn of the downstream side air-fuel ratio sensor 41. Specifically, as explained above, based on the minimum value of the output air-fuel ratio AFdwn of the downstream side air-fuel ratio sensor 41 in the above convergence time period, the degree of total deterioration is estimated assuming the lower the above minimum value, the lower the degree of total deterioration. Alternatively, based on the cumulative value of the difference of the output air-fuel ratio AFdwn from the stoichiometric air-fuel ratio in the above convergence time period, the degree of total deterioration is estimated assuming the larger the above cumulative value, the lower the degree of total deterioration.

Further, in the same way as the exhaust purification system according to the above fifth embodiment, the degree of deterioration due to S poisoning deterioration of the upstream side exhaust purification catalyst 20 is calculated, based on the degree of deterioration due to permanent deterioration of the upstream side exhaust purification catalyst 20 estimated by the output of the $NO_X$ sensor 46 and the degree of total deterioration of the upstream side exhaust purification catalyst 20 estimated based on the behavior of the output air-fuel ratio AFdwn of the downstream side air-fuel ratio sensor 41.

According to the present embodiment, in the same way as the above fifth embodiment, it is possible to estimate the degree of deterioration due to S poisoning deterioration, independently from the permanent deterioration and total deterioration. Due to this, it becomes possible to perform sulfur desorption processing at a suitable timing and is possible to keep the fuel economy from deteriorating and the purification ability of the upstream side exhaust purification catalyst 20 from falling.

Figure 21:
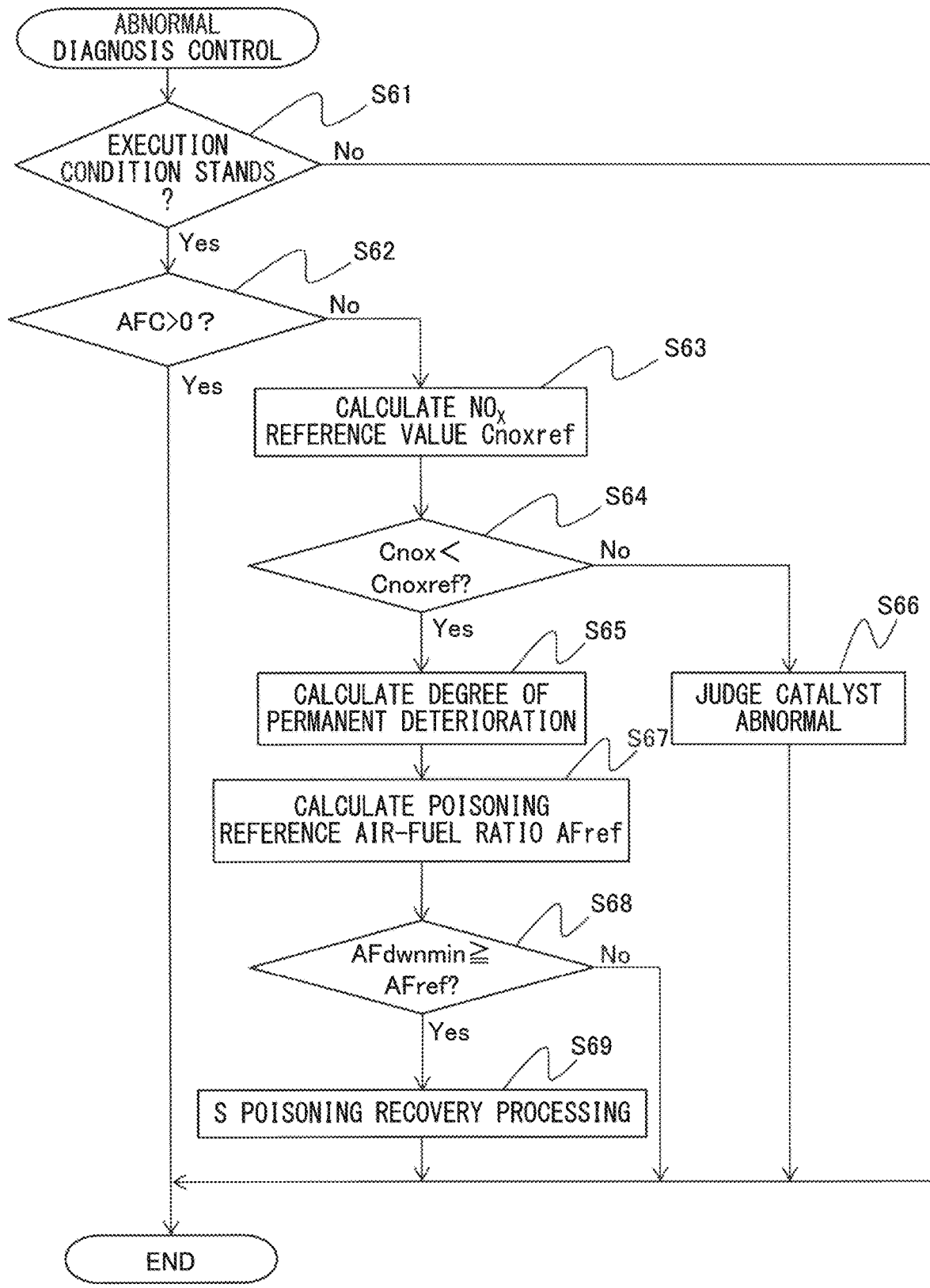
FIG. 21 is a flow chart showing a control routine of control for judgment of S poisoning, which judges a degree of deterioration due to S poisoning deterioration of the upstream side exhaust purification catalyst, in an exhaust purification system according to a sixth embodiment.

FIG. 21 is a flow chart showing a control routine of control for judging S poisoning which judges the degree of deterioration due to S poisoning deterioration of the upstream side exhaust purification catalyst 20, in the exhaust purification system according to the sixth embodiment. The illustrated control routine is performed every constant time interval. Steps S61 to S66 shown in FIG. 21 are similar to steps S41 to S46 of FIG. 15, and therefore explanations will be omitted.

If, at step S65, the degree of deterioration due to permanent deterioration of the upstream side exhaust purification catalyst 20 is calculated, next at step S67, the poisoning reference air-fuel ratio AFref is calculated based on the intake air amount and degree of deterioration due to permanent deterioration. The poisoning reference air-fuel ratio AFref is set so as to be lower (to become the rich side) as the intake air amount is greater. Further, the poisoning reference air-fuel ratio AFref is set so as to be higher (to become the lean side), as the degree of deterioration due to permanent deterioration is greater. Note that, at this time, the degree of deterioration due to S poisoning deterioration may be calculated by using a map showing the relationship among the intake air amount, the degree of deterioration due to permanent deterioration, and the degree of deterioration due to S poisoning deterioration.

Next, at step S68, the minimum value AFdwnmin of the output air-fuel ratio of the downstream side air-fuel ratio sensor 41 in the above convergence time period is calculated, and it is judged if the calculated minimum value AFdwnmin is equal to or greater than the poisoning reference air-fuel ratio AFref calculated at step S67. If at step S68 it is judged that the minimum value AFdwnmin is less than the poisoning reference air-fuel ratio AFref, the control routine is ended. On the other hand, if at step S68 it is judged that the minimum value AFdwnmin is the poisoning reference air-fuel ratio AFref or more, the routine proceeds to step S69. At step S69, the sulfur desorption processing and storage suppression processing are performed and the control routine is ended.

Seventh Embodiment

Next, referring to FIGS. 22 to 23, an exhaust purification system according to a seventh embodiment will be explained. The configuration and control in the exhaust purification system according to the seventh embodiment are basically the same as the configuration and control of the exhaust purification systems according to the fifth embodiment and the sixth embodiment. Therefore, the parts different from the exhaust purification systems according to the fifth embodiment and the sixth embodiment will be explained below.

<<Relationship Between Content of Sulfur Component of Fuel and Degree of Deterioration Due to S Poisoning Deterioration>>

In this regard, the content of the sulfur component in the fuel supplied to an internal combustion engine differs with each fuel. If using fuel with a high content of the sulfur component, S poisoning deterioration easily occurs, while if using fuel with a low content of the sulfur component, S poisoning deterioration is harder to occur. For this reason, to suppress deterioration of the fuel economy and a drop in the purification performance of the upstream side exhaust purification catalyst 20, it is necessary to change the control of the internal combustion engine corresponding to the content of the sulfur component. For example, if using fuel with a high content of the sulfur component, compared with when using fuel of a low content of the sulfur component, it may be considered to raise the rich degree of the rich set air-fuel ratio and lower the lean degree of the lean set air-fuel ratio. To change the control of the internal combustion engine in accordance with the content of the sulfur component in the fuel in this way, it is necessary to estimate the content of the sulfur component in the fuel.

Figure 22:
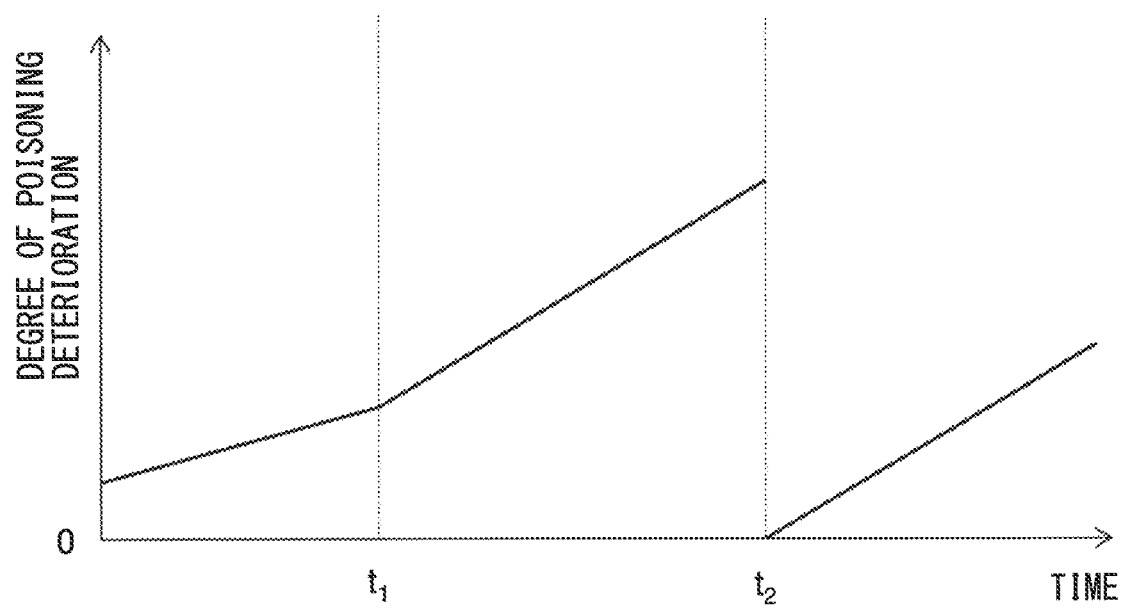
FIG. 22 is a time chart of the degree of deterioration due to S poisoning deterioration of the upstream side exhaust purification catalyst.

FIG. 22 is a time chart of the degree of deterioration due to S poisoning deterioration of the upstream side exhaust purification catalyst 20. In the example shown in FIG. 22, at the time $t_1$, fuel is supplied to the fuel tank (not shown) of the internal combustion engine. At the time $t_2$, sulfur desorption processing is performed.

As will be understood from FIG. 22, the degree of deterioration due to S poisoning deterioration of the upstream side exhaust purification catalyst 20 rises along with the elapse of time. This is because the exhaust gas discharged from a combustion chamber 5 contains a sulfur component corresponding to the content of the sulfur component in the fuel supplied to the combustion chamber 5 and when the exhaust gas passes through the upstream side exhaust purification catalyst 20, this sulfur component is stored in the upstream side exhaust purification catalyst 20. If the content of the sulfur component in the fuel supplied to the combustion chamber 5 is constant, the ratio of rise of the degree of deterioration due to S poisoning deterioration with respect to time is substantially constant (more precisely, the rate of rise of the degree of deterioration due to S poisoning deterioration with respect to the cumulative value of the intake air amount is substantially constant). For this reason, as shown in FIG. 22, before the time $t_1$, the rate of rise of the degree of deterioration due to S poisoning deterioration (that is, the slant in FIG. 22) is maintained constant.

Then, if at the time $t_1$ fuel is supplied to the fuel tank, the rate of rise of the degree of deterioration due to S poisoning deterioration after the time $t_1$ is higher than that before the time $t_1$. This is because the content of the sulfur component in the fuel supplied at the time $t_1$ is higher than the content of the sulfur component in the fuel which had been supplied before at the time $t_1$.

Then, at the time $t_2$, sulfur desorption processing is performed. If performing sulfur desorption processing, the sulfur component stored at the upstream side exhaust purification catalyst 20 is desorbed. For this reason, at the time $t_2$, the degree of deterioration due to S poisoning deterioration is substantially zero. Then, if the operating time of the internal combustion engine becomes longer, the degree of deterioration due to S poisoning deterioration of the upstream side exhaust purification catalyst 20 again gradually rises.

As explained above, the amount of rise of the degree of deterioration due to S poisoning deterioration per unit time (or per amount of unit increase of cumulative value of intake air amount) (rate of rise of degree of deterioration due to S poisoning deterioration) is proportional to the content of the sulfur component in the fuel supplied to a combustion chamber 5. Therefore, by calculating the rate of rise of the degree of deterioration due to S poisoning deterioration per unit time, it is possible to calculate the content of the sulfur component in the fuel.

In particular, if fuel was supplied to the fuel tank, the content of the sulfur component in the fuel supplied to a combustion chamber 5 also changes, and therefore the content of the sulfur component in the fuel is preferably calculated based on the rate of rise of the degree of deterioration due to S poisoning deterioration per unit time right after fuel has been supplied to the fuel tank. Further, if performing sulfur desorption processing, the sulfur component stored in the upstream side exhaust purification catalyst 20 becomes substantially zero. Therefore, the degree of deterioration due to S poisoning deterioration at this time can be estimated considerably accurately. Therefore, it is preferable to calculate the content of the sulfur component in the fuel based on the rate of rise of the degree of deterioration due to S poisoning deterioration per unit time right after completion of sulfur desorption processing.

<<Control in Seventh Embodiment>>

Therefore, in the present embodiment, content estimation control is performed for estimating the content of the sulfur component in the fuel supplied to the internal combustion engine based on the trend in the degree of deterioration due to S poisoning deterioration of the upstream side exhaust purification catalyst 20 with respect to the time or the change of the cumulative value of the intake air amount. In particular, assuming that the larger the change in the degree of deterioration due to S poisoning deterioration of the upstream side exhaust purification catalyst 20 with respect to the time or the change of the cumulative value of the intake air amount (the higher the rate of rise of the degree of deterioration due to S poisoning deterioration), the higher the content of the sulfur component in the fuel which is estimated.

Further, in the present embodiment, the content estimation control is started after the end of the sulfur desorption processing for desorption of the sulfur component stored at the upstream side exhaust purification catalyst 20. Alternatively, in the present embodiment, the content estimation control is started after fuel finishes being supplied to the fuel tank.

According to the present embodiment, the content of the sulfur component in the fuel can be accurately estimated based on the trend in the degree of deterioration due to S poisoning deterioration of the upstream side exhaust purification catalyst 20. Further, by performing the content estimation control right after completion of the sulfur desorption processing, it is possible to more accurately estimate the content of the sulfur component in the fuel.

Figure 23:
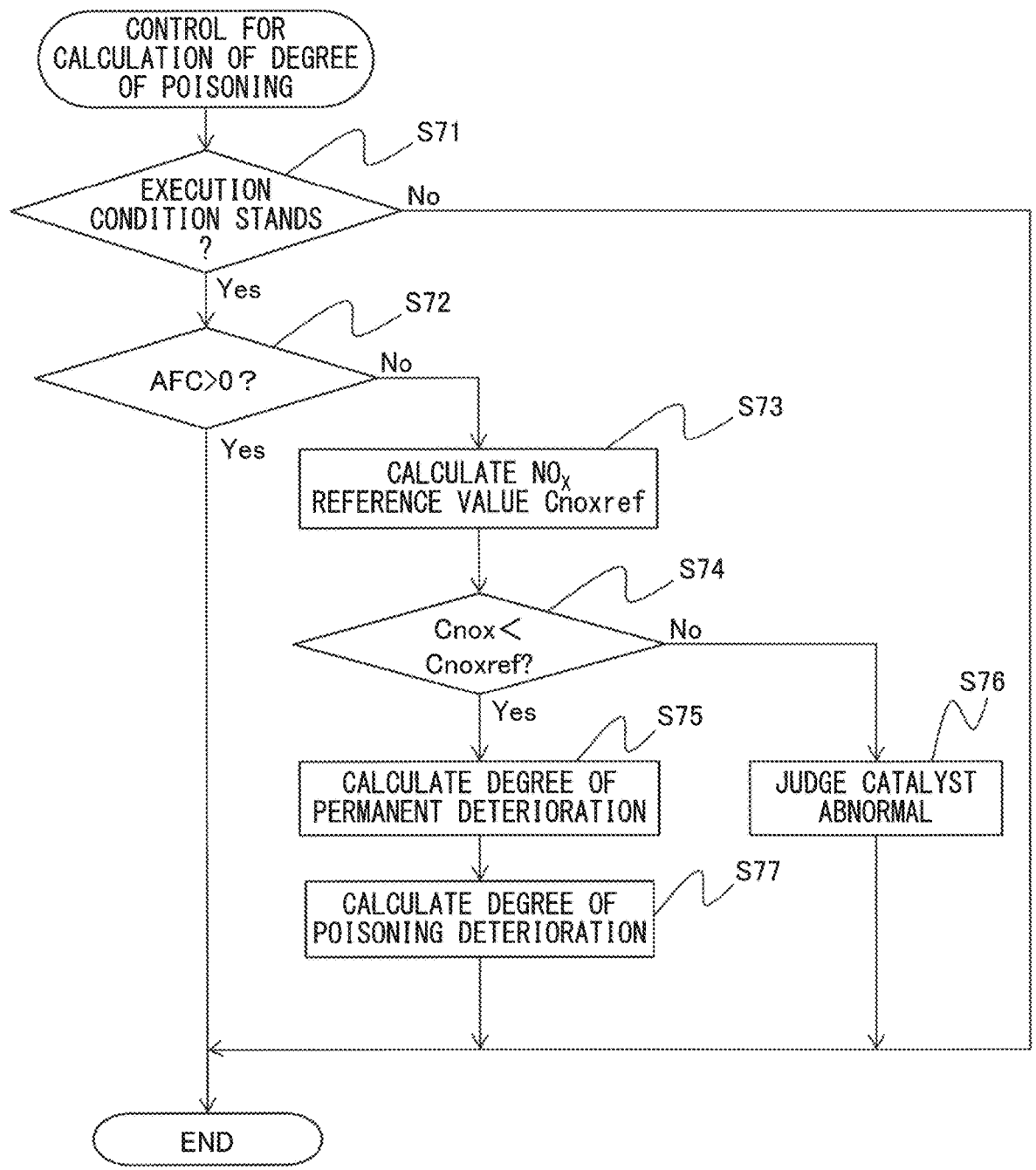
FIG. 23 is a flow chart showing a control routine of control for calculation of a degree of deterioration due to S poisoning, which calculates the degree of deterioration due to S poisoning deterioration of the upstream side exhaust purification catalyst.

FIG. 23 is a flow chart showing a control routine of S poisoning deterioration degree calculation control for calculating a degree of deterioration due to S poisoning deterioration of the upstream side exhaust purification catalyst 20. To calculate the content of the sulfur component in the fuel, the degree of deterioration due to S poisoning deterioration of the upstream side exhaust purification catalyst 20 has to be calculated, and therefore the present control is performed. The illustrated control routine is performed every constant time interval. Steps S71 to S76 shown in FIG. 23 are similar to steps S41 to S46 of FIG. 15, and therefore explanations will be omitted.

If at step S75 the degree of deterioration due to permanent deterioration of the upstream side exhaust purification catalyst 20 is calculated, at the next step S77, the degree of deterioration due to S poisoning deterioration is calculated by using a map such as shown in FIGS. 17 and 18, and the control routine is ended.

Figure 24:
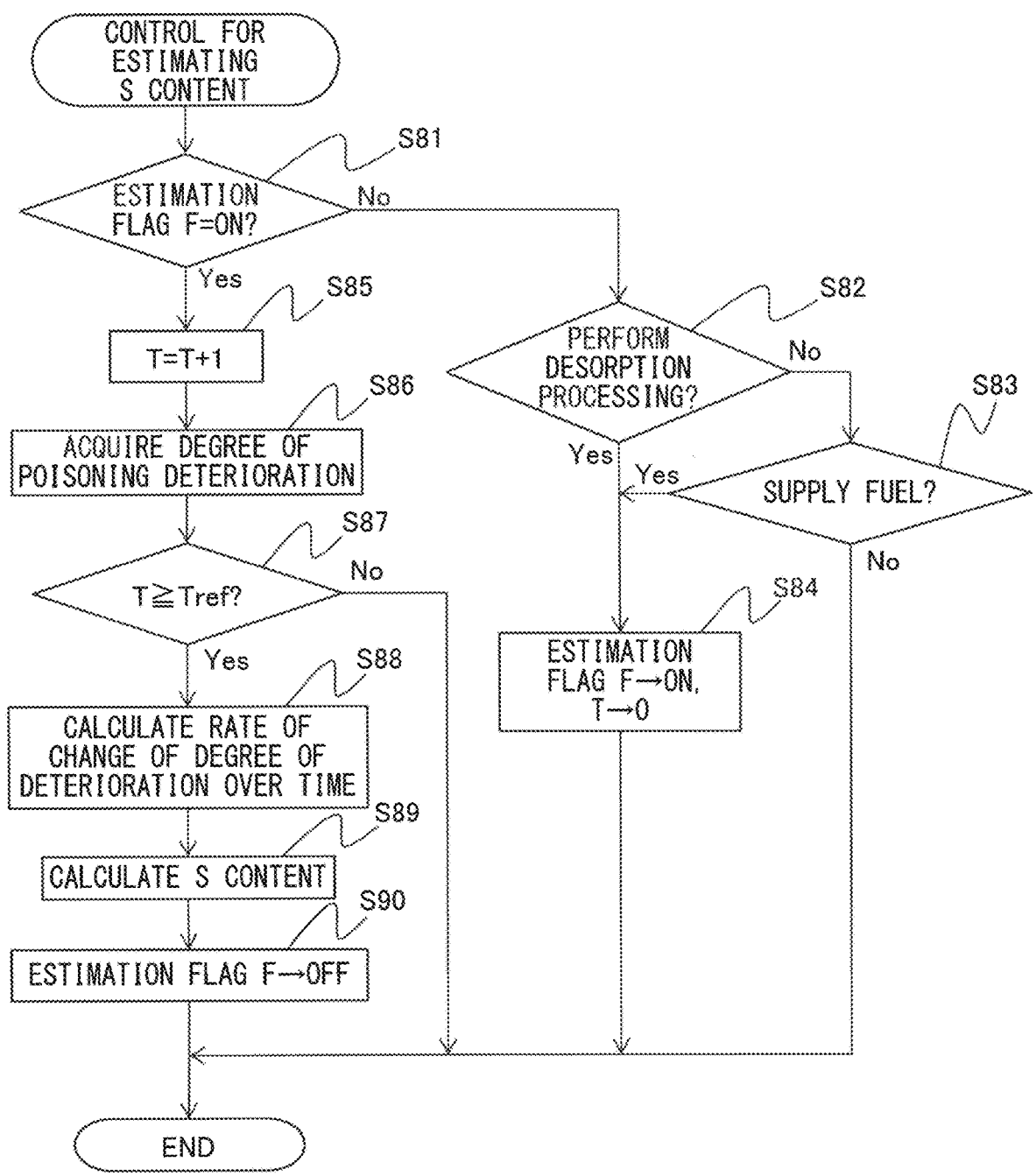
FIG. 24 is a flow chart showing a control routine of control for estimation of a content of a sulfur component, which estimates the content of the sulfur component in the fuel supplied to a combustion chamber.

FIG. 24 is a flow chart showing sulfur component content estimation control for estimating the content of the sulfur component in the fuel supplied to a combustion chamber 5. The illustrated control routine is performed every constant time interval.

First, at step S81, it is judged if the estimation flag F is ON. The estimation flag F is a flag which is set ON during estimation of the content of the sulfur component and otherwise is set OFF. When at step S81 it is judged that the content of the sulfur component is not being estimated and thus the estimation flag F is OFF, the routine proceeds to step S82.

At step S82, it is judged if sulfur desorption processing has been performed, while at step S83, it is judged if fuel has been supplied to the fuel tank. The supply of fuel to the fuel tank is detected by, for example, detecting that the amount of fuel detected by a sensor for detecting the amount of fuel in the fuel tank has increased or that a cap is open by a cap sensor detecting opening/closing of a cap of a fuel tank. When at step S82 it is judged that sulfur desorption processing has not been performed and at step S83 it is judged that fuel has not been supplied to the fuel tank, the control routine is ended. On the other hand, if it is judged at step S82 that sulfur desorption processing has been performed or if at step S83 it is judged that fuel has been supplied to the fuel tank, the routine proceeds to step S84. At step S84, the estimation flag F is set ON and the time counter T is reset to 0.

If the estimation flag F is set ON, at the next control routine, it is judged at step S81 that the estimation flag F is set ON and the routine proceeds to step S85. At step S85, the value of the time counter T plus 1 is made the new value of the time counter T. Next, at step S86, the degree of deterioration due to S poisoning deterioration calculated at step S77 of FIG. 23 is acquired.

Next, at step S87, it is judged if the value of the time counter T calculated at step S85 is a predetermined reference value Tref or more. If at step S87 it is judged that the value of the time counter T is less than the reference value Tref, the control routine is ended. On the other hand, if at step S87 it is judged that the value of the time counter T is the reference value Tref or more, the routine proceeds to step S88.

At step S88, the amount of change of the degree of deterioration due to S poisoning deterioration after the estimation flag is set ON, divided by the time corresponding to the reference value Tref of the time counter, is calculated as the rate of change of the degree of deterioration due to S poisoning deterioration per unit time. Next, at step S89, the content of the sulfur component in the fuel is calculated based on the rate of change of the degree of deterioration due to S poisoning deterioration per unit time calculated at step S88. Next, at step 390, the estimation flag F is reset to OFF and the control routine is ended.

Note that, in all of the above embodiments, as the basic air-fuel ratio control, the target air-fuel ratio is repeatedly alternately set at a rich set air-fuel ratio and a lean set air-fuel ratio. However, such control is not necessarily required. The target air-fuel ratio does not have to be repeatedly set so long as being set at least once each to a rich set air-fuel ratio and lean set air-fuel ratio.

1. engine body
5. combustion chamber
7. intake port
9. exhaust port
19. exhaust manifold
20. upstream side exhaust purification catalyst
24. downstream side exhaust purification catalyst
31. ECU
40. upstream side air-fuel ratio sensor
41. downstream side air-fuel ratio sensor
46. $NO_X$ sensor

The invention claimed is:

1. An exhaust purification system of an internal combustion engine, comprising:
    an exhaust purification catalyst provided in an exhaust passage of the internal combustion engine and carrying a catalyst precious metal;
    a NOx sensor provided in the exhaust purification catalyst or in the exhaust passage at a downstream side of the exhaust purification catalyst in a direction of flow of exhaust;
    an air-fuel ratio sensor provided in the exhaust passage at the downstream side of the exhaust purification catalyst in the direction of flow of exhaust; and
    a control device for controlling a target air-fuel ratio of exhaust gas flowing into the exhaust purification catalyst and estimating a state of the exhaust purification catalyst based on an output of the NOx sensor,
    wherein the control device is configured to alternately set the target air-fuel ratio to a rich air-fuel ratio richer than a stoichiometric air-fuel ratio and a lean air-fuel ratio leaner than the stoichiometric air-fuel ratio, and switch the target air-fuel ratio from a rich air-fuel ratio to a lean air-fuel ratio when the air-fuel ratio of exhaust gas detected by the air-fuel ratio sensor becomes equal to or less than a rich judged air-fuel ratio richer than the stoichiometric air-fuel ratio, and
    wherein the control device is configured to estimate a degree of irreversible deterioration of the exhaust purification catalyst accompanying sintering of the catalyst precious metal, not based on the output of the NOx sensor when the air-fuel ratio of exhaust gas flowing into the exhaust purification catalyst is a lean air-fuel ratio, but based on the output of the NOx sensor when the air-fuel ratio of exhaust gas flowing into the exhaust purification catalyst is a rich air-fuel ratio, in a first deterioration degree estimation control.

2. The exhaust purification system of an internal combustion engine according to claim 1, wherein the control device is configured to diagnose abnormality in the exhaust purification catalyst based on the degree of irreversible deterioration, and diagnose abnormality in the exhaust purification catalyst when the air-fuel ratio of exhaust gas flowing into the exhaust purification catalyst is a rich air-fuel ratio, but not diagnose abnormality in the exhaust purification catalyst when the air-fuel ratio of exhaust gas flowing into the exhaust purification catalyst is a lean air-fuel ratio.

3. The exhaust purification system of an internal combustion engine according to claim 1, wherein the control device is configured to, in the first deterioration degree estimation control, estimate the degree of irreversible deterioration of the exhaust purification catalyst, based on the output of the NOx sensor in a center time period when the air-fuel ratio of the exhaust gas flowing into the exhaust purification catalyst is a rich air-fuel ratio and away from switching time periods when switching the target air-fuel ratio to a rich air-fuel ratio and when switching the target air-fuel ratio to a lean air-fuel ratio.

4. The exhaust purification system of an internal combustion engine according to claim 1, wherein
    the control device is configured to estimate a degree of total deterioration of the exhaust purification catalyst including the irreversible deterioration and reversible deterioration due to sulfur poisoning of the exhaust purification catalyst without using output of the NOx sensor, in a second deterioration degree estimation control, and
    the control device is configured to estimate the degree of reversible deterioration of the exhaust purification catalyst, based on the degree of total deterioration estimated by the second deterioration degree estimation control and the degree of irreversible deterioration estimated by the first deterioration degree estimation control.

5. The exhaust purification system of an internal combustion engine according to claim 3, wherein
    the control device is configured to estimate a degree of total deterioration of the exhaust purification catalyst including the irreversible deterioration and reversible deterioration due to sulfur poisoning of the exhaust purification catalyst without using output of the NOx sensor, in a second deterioration degree estimation control, and the control device is configured to set a poisoning reference value based on the degree of irreversible deterioration estimated by the first deterioration degree estimation control so as to be larger as the degree of irreversible deterioration is larger, and judge that the exhaust purification catalyst is poisoned by sulfur if the degree of total deterioration estimated by the second deterioration degree estimation control has become the poisoning reference value or more.

6. The exhaust purification system of an internal combustion engine according to claim 4, wherein the control device is configured to, in the second deterioration degree estimation control, estimate the degree of total deterioration of the exhaust purification catalyst, based on a first amount of oxygen stored in the exhaust purification catalyst from when an output air-fuel ratio of the air-fuel ratio sensor is a rich judged air-fuel ratio richer than the stoichiometric air-fuel ratio or less to when the output air-fuel ratio becomes a lean judged air-fuel ratio leaner than the stoichiometric air-fuel ratio or a value of a parameter changing in accordance with the first amount of oxygen, or based on a second amount of oxygen released from the exhaust purification catalyst from when an output air-fuel ratio of the air-fuel ratio sensor is a lean judged air-fuel ratio or more to when the output air-fuel ratio becomes a rich judged air-fuel ratio or less or a value of a parameter changing in accordance with the second amount of oxygen.

7. The exhaust purification system of an internal combustion engine according to claim 4, wherein the control device is configured to, in the second deterioration degree estimation control, estimate the degree of total deterioration of the exhaust purification catalyst based on at least part of the behavior of the output air-fuel ratio of the air-fuel ratio sensor after the target air-fuel ratio is switched from the rich air-fuel ratio to the lean air-fuel ratio and before the output air-fuel ratio of the air-fuel ratio sensor reaches the stoichiometric air-fuel ratio.

8. The exhaust purification system of the internal combustion engine according to claim 4, wherein the control device is configured to estimate a sulfur content of fuel supplied to the internal combustion engine based on a trend in the degree of reversible deterioration of the exhaust purification catalyst with respect to a time or a change of a cumulative value of an intake air amount in content estimation control.

9. The exhaust purification system of the internal combustion engine according to claim 8, wherein the control device is configured to perform sulfur desorption processing for desorbing the sulfur component stored at the exhaust purification catalyst, and the content estimation control is started after completion of the sulfur desorption processing.

* * * * *